Figure 1:
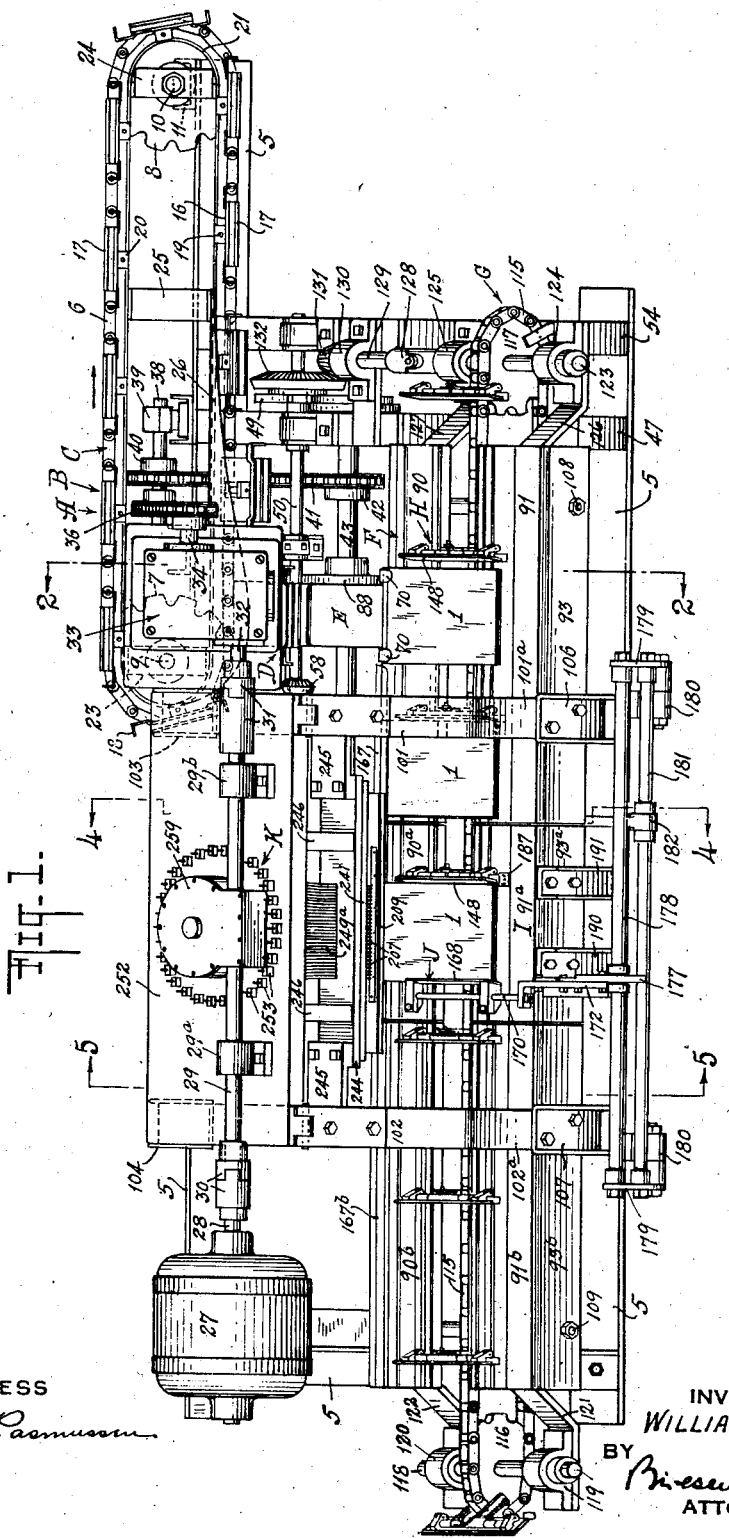

June 9, 1942.  W. A. DE HART  2,285,911
PAPER CUTTING MACHINE
Filed March 3, 1939  13 Sheets-Sheet 1

WITNESS
G. V. Rasmussen

INVENTOR
WILLIAM A. DE HART
BY
Biesen Schenk
ATTORNEYS

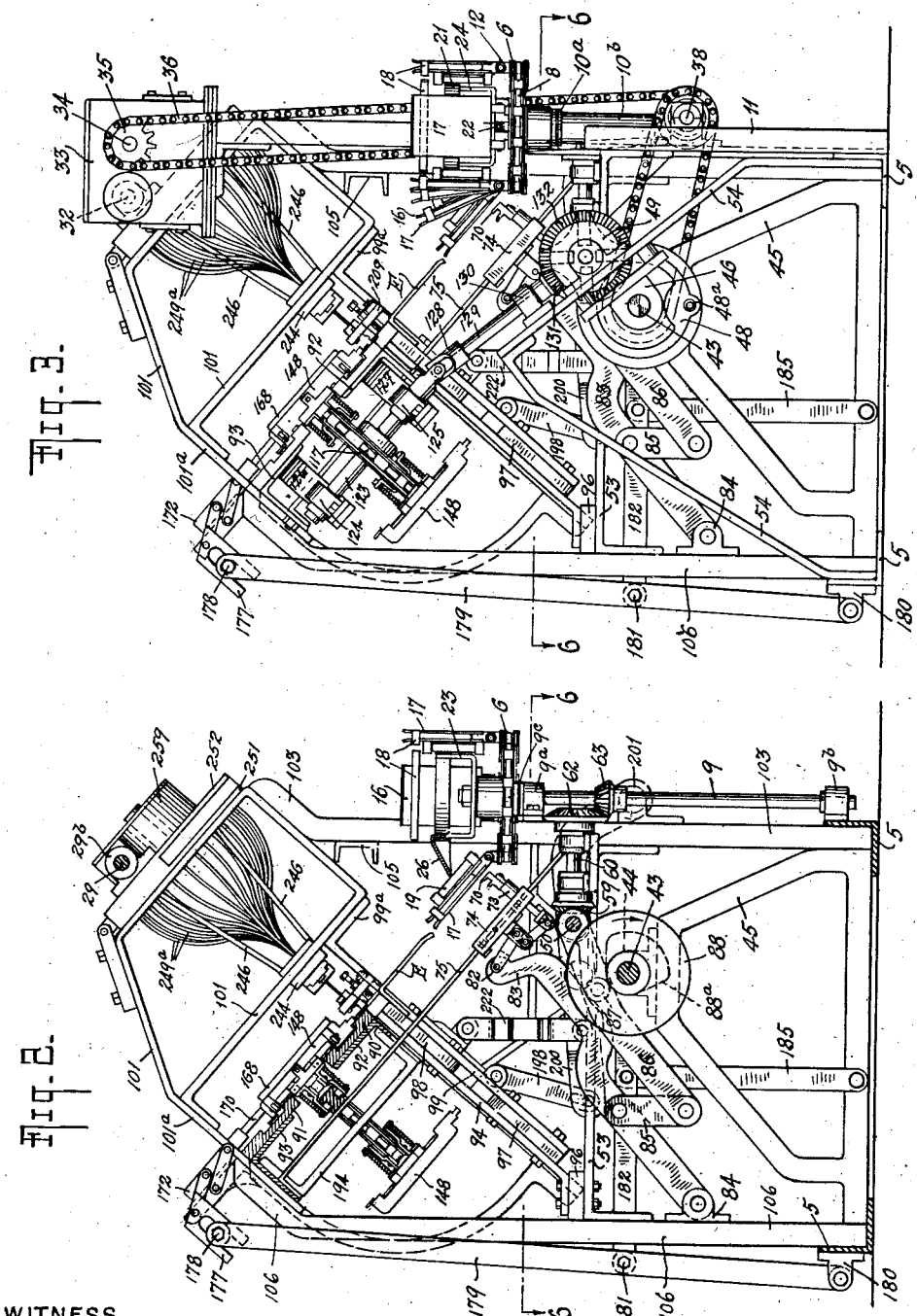

June 9, 1942.　　　W. A. DE HART　　　2,285,911
PAPER CUTTING MACHINE
Filed March 3, 1939　　　13 Sheets-Sheet 3
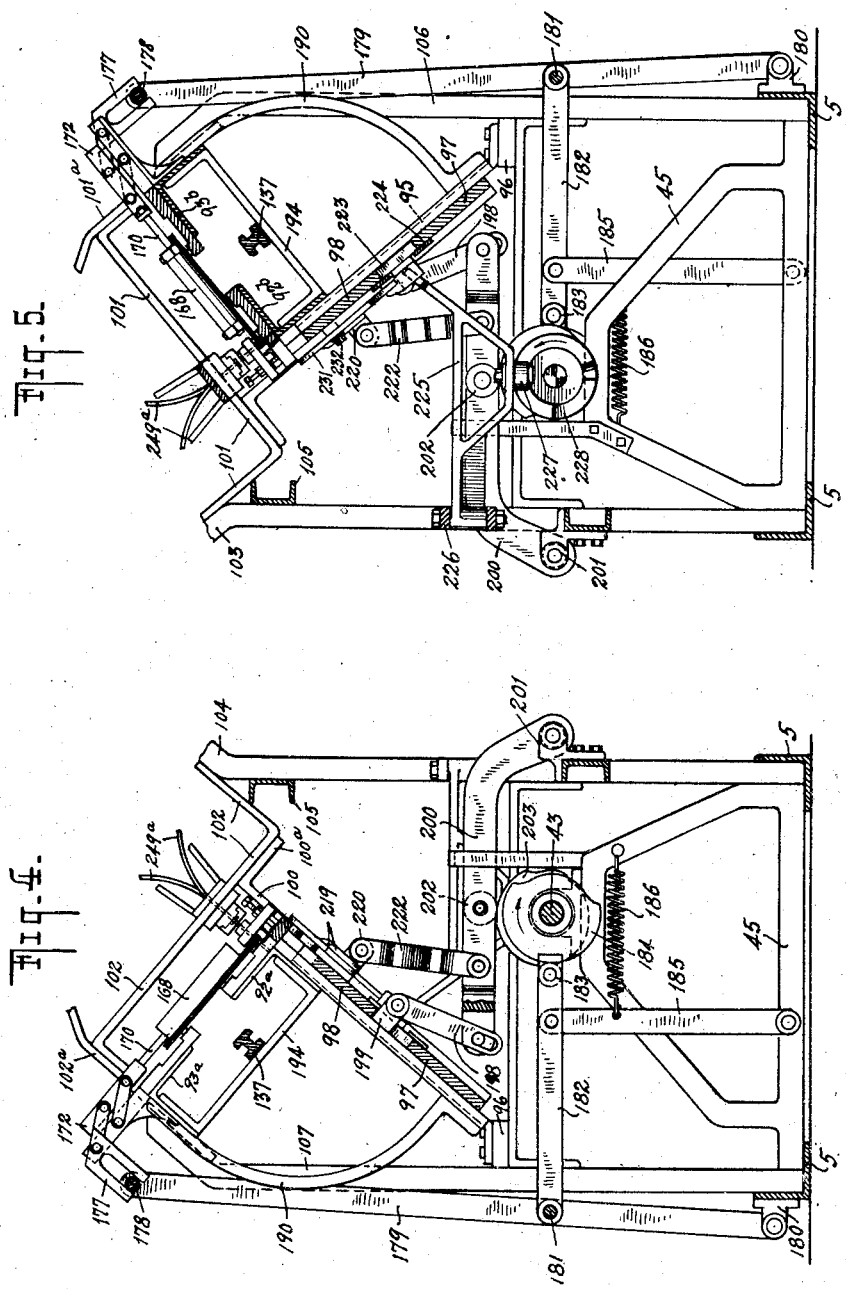
WITNESS
INVENTOR
WILLIAM A. DE HART
BY
ATTORNEYS June 9, 1942.                W. A. DE HART                2,285,911
                          PAPER CUTTING MACHINE
                          Filed March 3, 1939          13 Sheets-Sheet 4
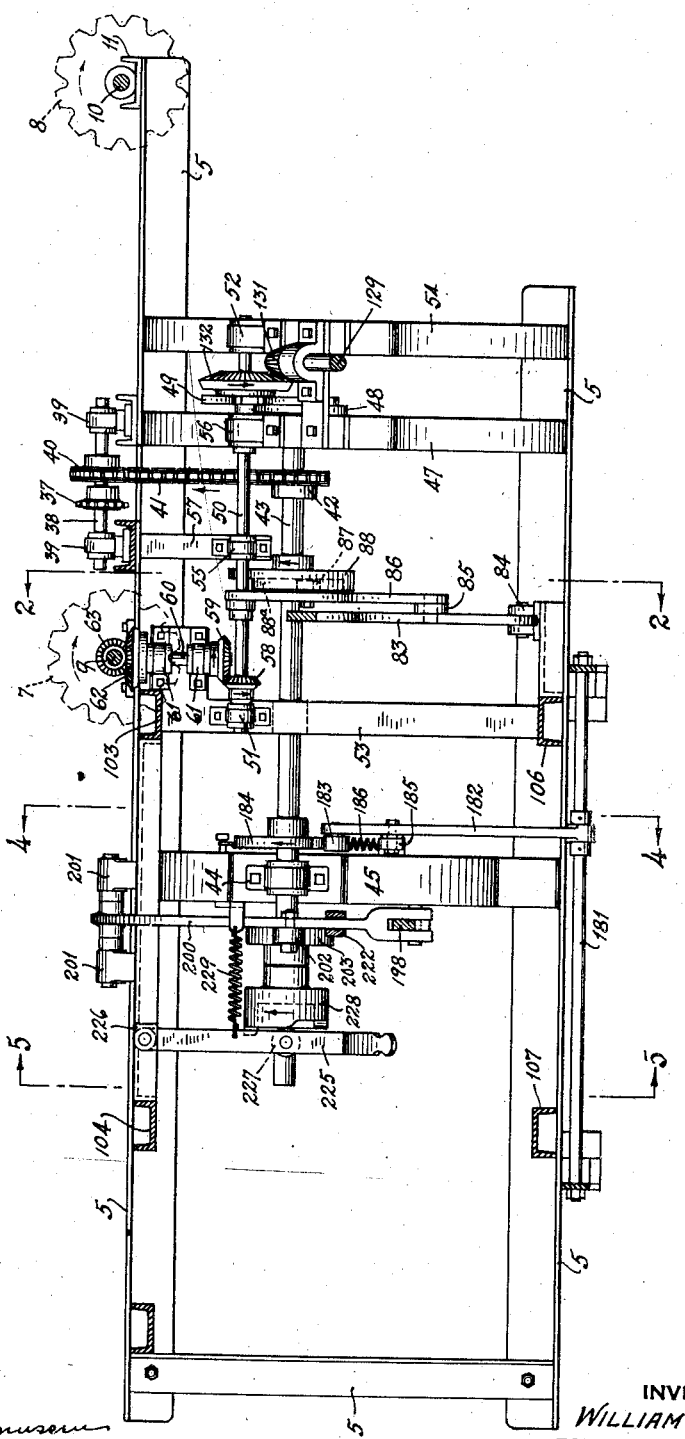
WITNESS                                                 INVENTOR
                                                   WILLIAM A. DE HART
                                                   BY
                                                        ATTORNEYS

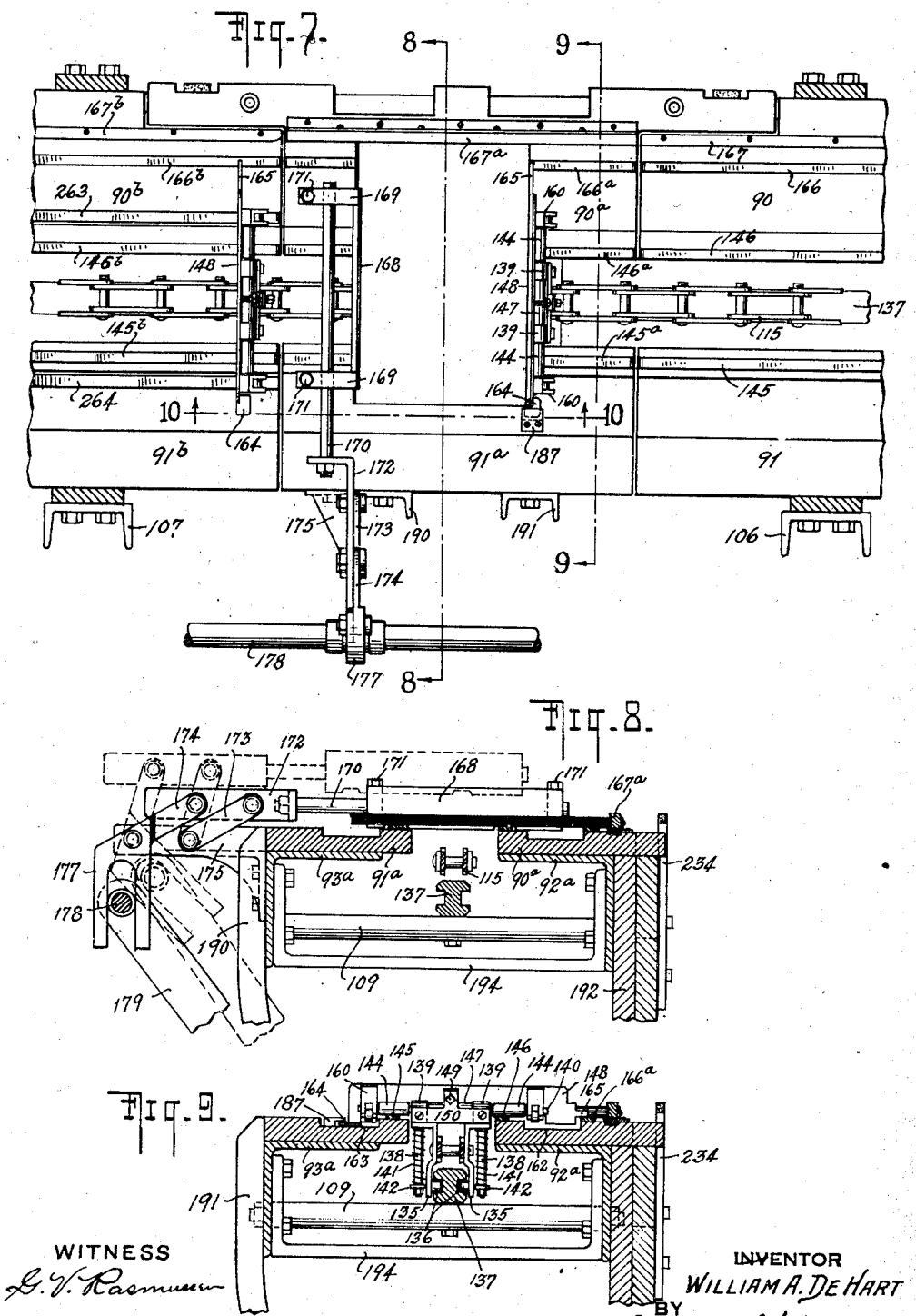

June 9, 1942. W. A. DE HART 2,285,911
PAPER CUTTING MACHINE
Filed March 3, 1939 13 Sheets-Sheet 6
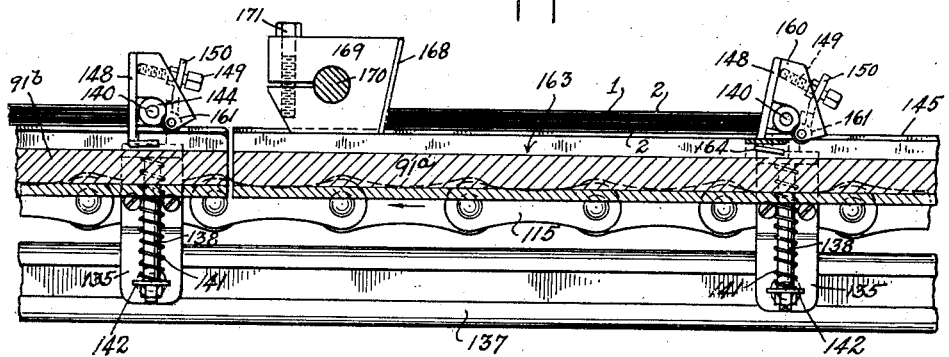
INVENTOR
WILLIAM A. DE HART

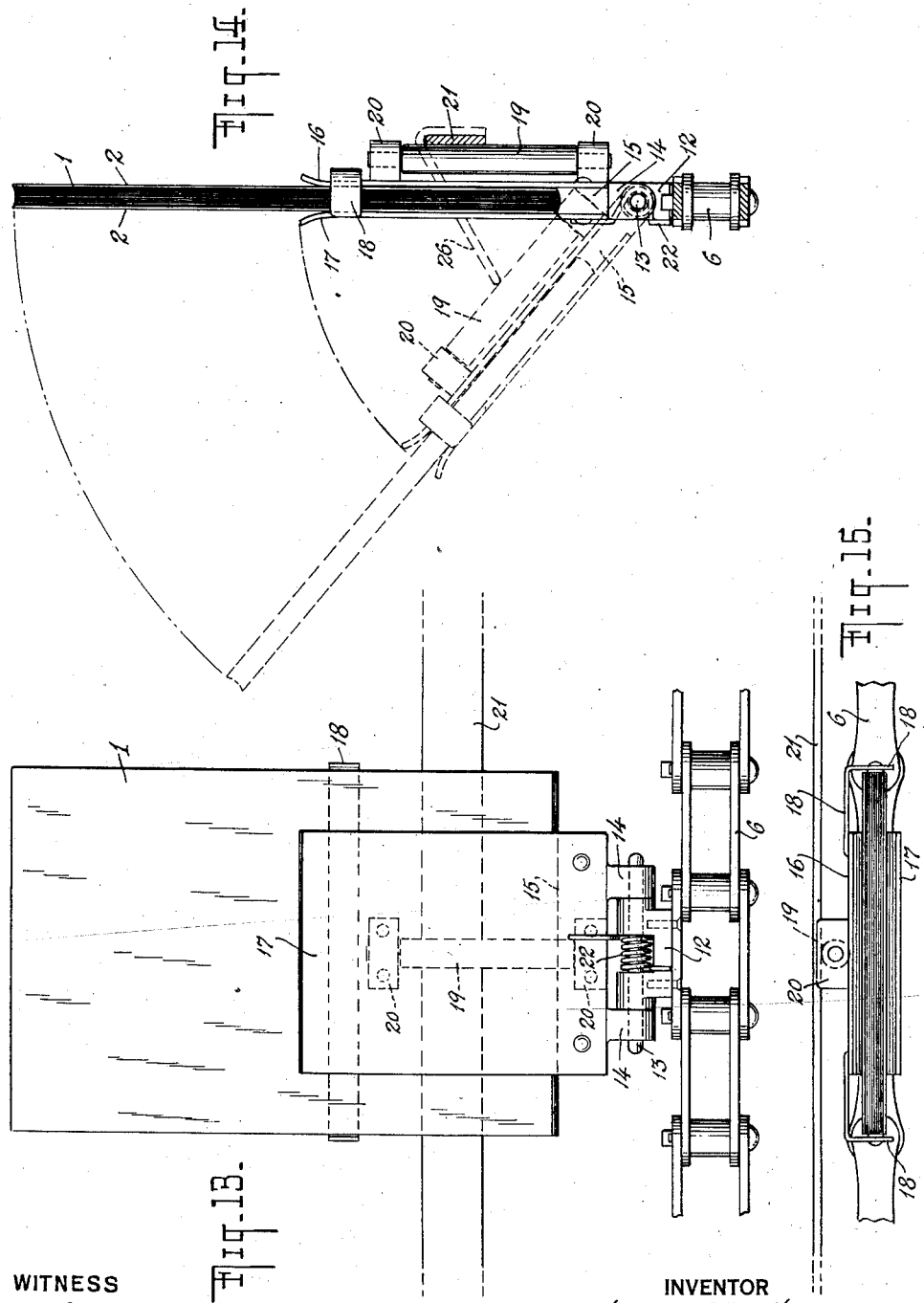

June 9, 1942.　　　W. A. DE HART　　　2,285,911
PAPER CUTTING MACHINE
Filed March 3, 1939　　　13 Sheets-Sheet 8
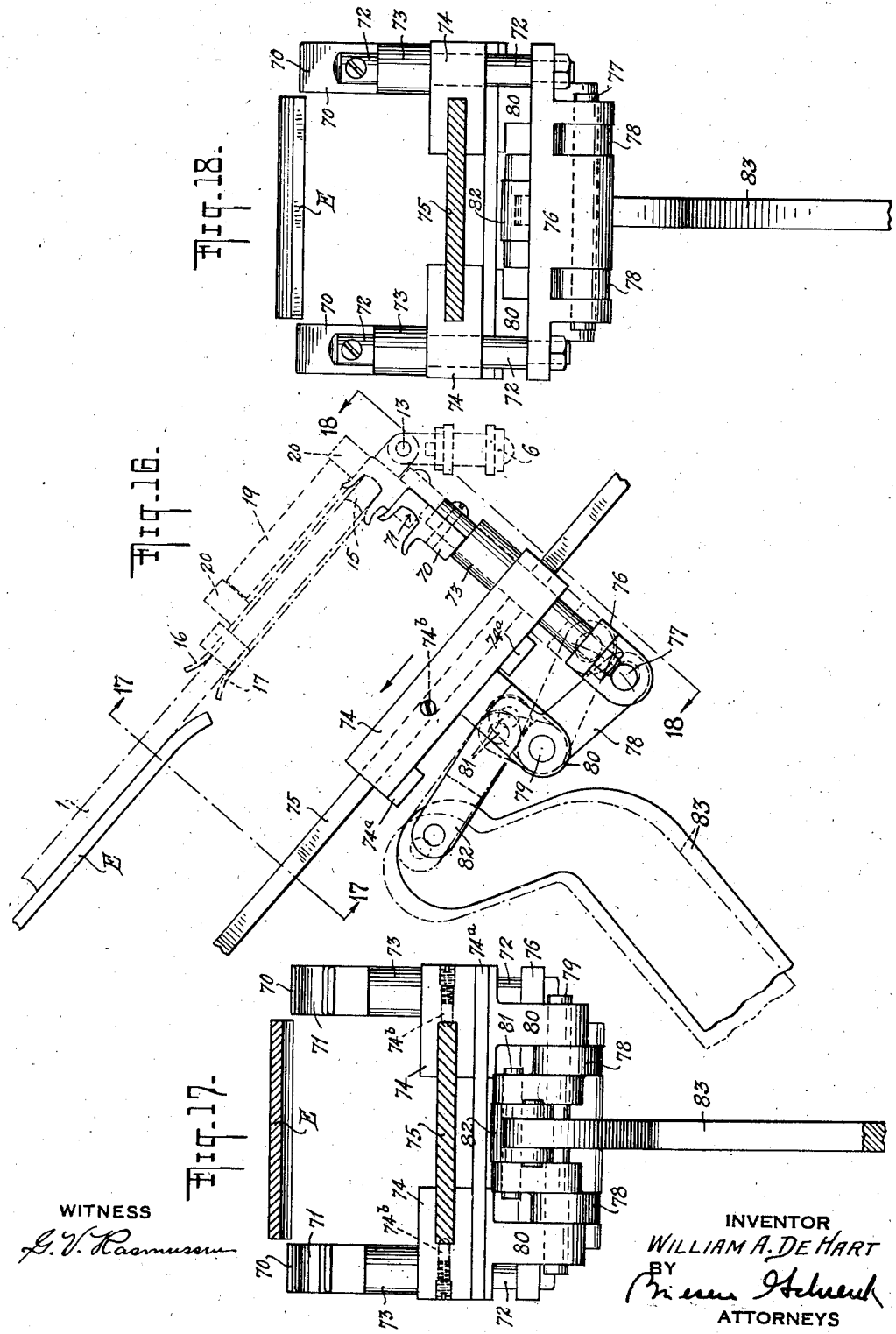
WITNESS
INVENTOR
WILLIAM A. DE HART
BY
ATTORNEYS June 9, 1942.                W. A. DE HART                2,285,911
                          PAPER CUTTING MACHINE
                       Filed March 3, 1939    13 Sheets-Sheet 10

INVENTOR
WILLIAM A. DE HART

June 9, 1942.  W. A. DE HART  2,285,911
PAPER CUTTING MACHINE
Filed March 3, 1939  13 Sheets-Sheet 11

WITNESS
G. V. Rasmussen

INVENTOR
WILLIAM A. DE HART
BY
ATTORNEYS

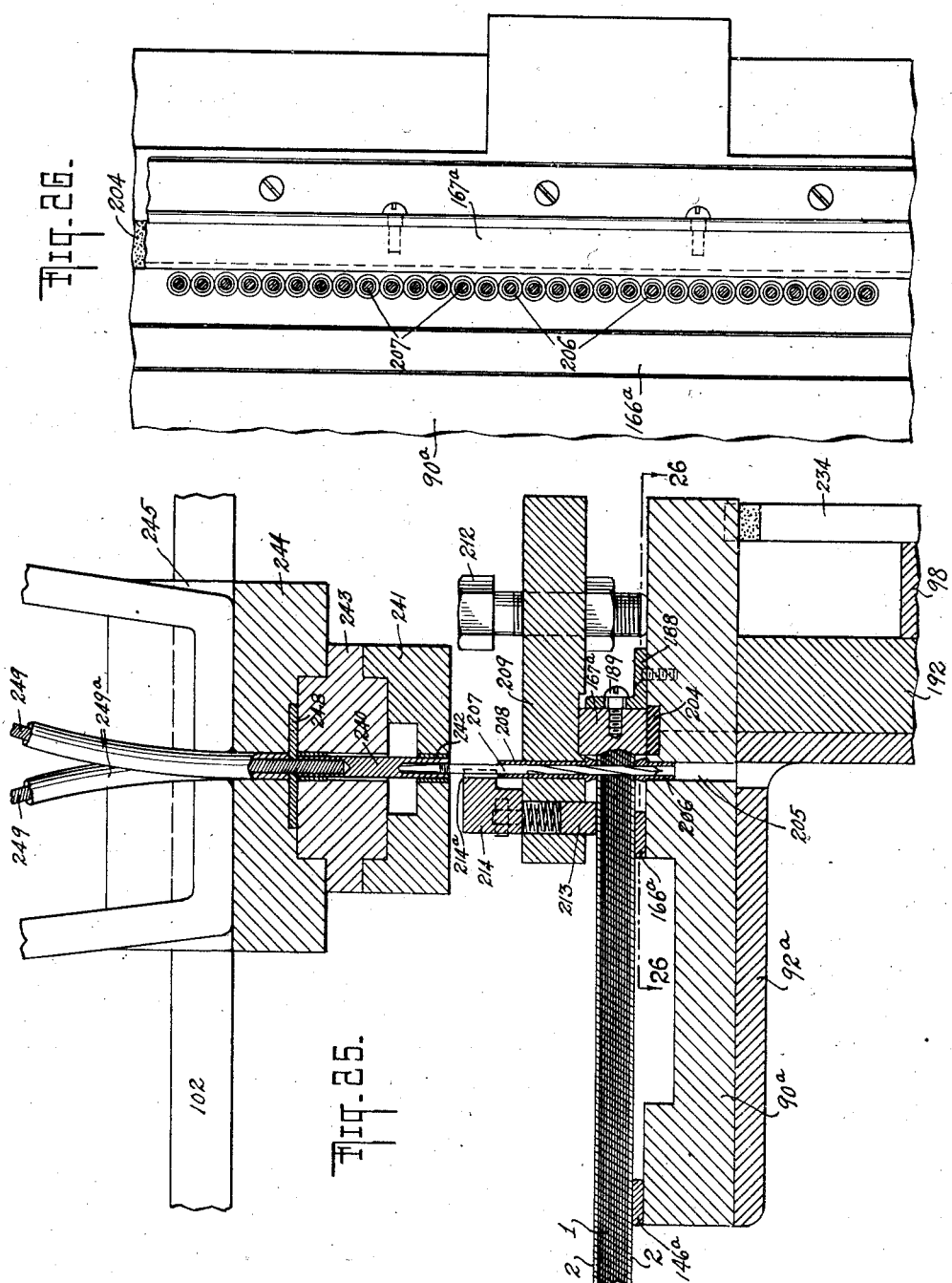

June 9, 1942.  W. A. DE HART  2,285,911
PAPER CUTTING MACHINE
Filed March 3, 1939    13 Sheets-Sheet 13
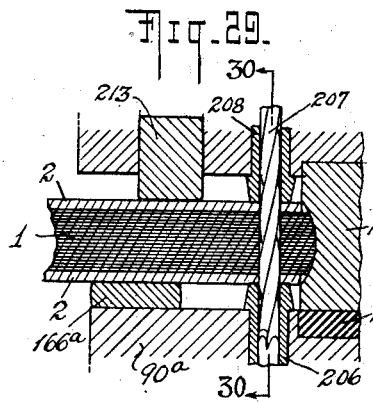
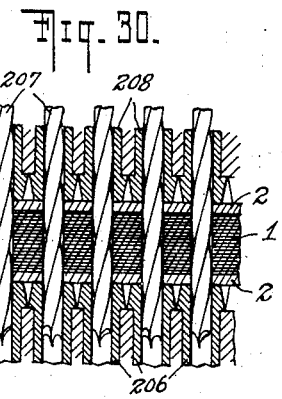
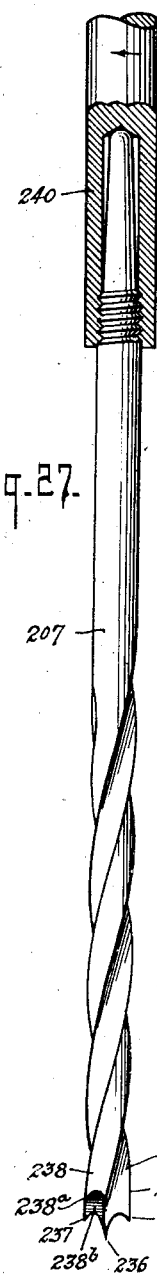
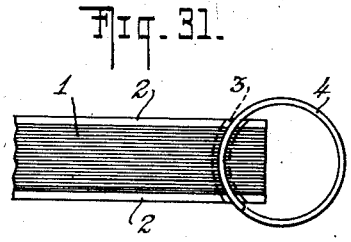
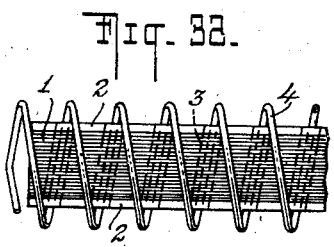
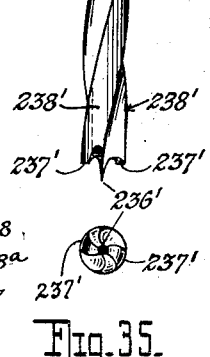
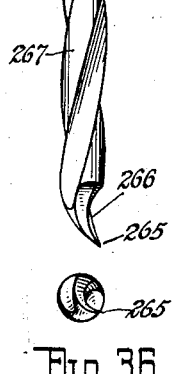
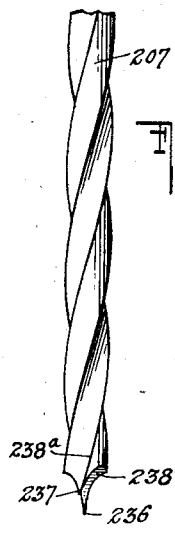
WITNESS
INVENTOR
WILLIAM A. DE HART
BY
ATTORNEYS Patented June 9, 1942

2,285,911

UNITED STATES PATENT OFFICE 2,285,911

PAPER CUTTING MACHINE

William A. De Hart, Teaneck, N. J., assignor to Kamket Corporation, New York, N. Y., a corporation of New York Application March 3, 1939, Serial No. 259,593

29 Claims. (Cl. 77—22)

This invention relates to a machine for drilling and cutting through a stack of paper sheets to provide the sheets with apertures or holes so that they may be utilized as fillers in loose leaf books or bound together by a binder into book form.

Books consisting of a large number of paper sheets perforated along one edge thereof and then bound together by a binder have now come into general use for all kinds of purposes. Many of the binders used today are made so that portions thereof pass through the sheets a large number of times. This is especially true of the spiral type of binder which consists of a spirally swisted wire whose convolutions pass through the apertures in the sheets. As it is preferred to use a spiral binder whose convolutions are closely related and are of a minimum size in order to minimize the bulkiness of the book and to avoid other objectionable features, the perforations in the sheets of books utilizing this type of binder are usually of small diameter, some of such perforations being from .0185 of an inch to .067 of an inch in diameter, and are closely related to each other and to the binding edge of the sheets so that the solid portions of the paper between perforations and between the latter and the binding edge of the sheets are exceedingly narrow in width. It has been the practice in manufacturing books of this type to cut the holes in the sheets in a plurality of operations. Formerly this was accomplished by ground solid pin or bar punches which were caused to descend upon a small pile of sheets, the thickness of the pile being restricted to $\frac{1}{16}$ inch or less depending on the class of paper to be punched. After the holes had been punched in the several piles, the latter were united to form the complete book. This method had many disadvantages and in an effort to find a more satisfactory and efficient method of perforating the sheets, the art turned to the drill press. Experiments with twist drills, however, proved unsatisfactory and the art decided that in order to drill holes in paper, to drill as cleanly as possible, a hollow punch drill was necessary. While with this type of drill it is possible to drill holes completely through the book in one operation thus obviating the necessity of dividing the book into small piles, it was found that all the holes in a row could not be drilled in one operation due to the inherent construction of such presses. It was necessary, therefore, to cut the holes in a number of operations by first cutting widely spaced initial perforations, then moving the book along to cut the next set of perforations and repeating this operation until all the holes were cut. The number of cutting operations required to complete the row of holes is dependent on the number of holes required to the inch, for example, forming five perforations to the inch requires five separate operations to complete five sets of perforations. Such operations required that the book be fed step-by-step toward the punches in order to bring the punches into alignment with the holes that had already been punched. This is the method used today and while it has many advantages over the paper punch, it is not satisfactory from an economic standpoint in an industry whose products sell at extremely low prices and where costs of production are of the utmost importance. The many operations required in making this class of product have not been a matter of choice but one of necessity for the reason that no satisfactory means were available or known to form all of the perforations at the same time through the full thickness of the book.

The hollow drill press possesses other disadvantages which do not render its use entirely satisfactory. In order to be efficiently used, these drills must be sharpened properly and be ground with the correct bevel. This is essential for satisfactory results and must be done frequently. In drilling there is a tendency of the sheets to pucker and the holes cut out are often upset or burred on the underside from drill entry. The discs of paper cut out from the sheets accumulate within the hollow bores of the drills unless some means are provided for removing them. Due to the fact that only a limited number of holes can be drilled in one operation with this machine, it is extremely difficult and impractical to get sufficient accuracy to permit insertion of the smaller spiral wires as in practical work the small holes suitable for the size of wire used would vary both in hole-to-hole spacing and marginal distance from the allowance necessary for spiral insertion. These inaccuracies necessitated that the holes be made oversize to compensate for misalignment and so that the assembled sheets would conform to the spiral arcs of the wire convolutions.

It is the purpose of the present invention to provide a paper cutting machine based on an entirely new theory of operation which will accurately drill a complete row of holes all at the same time through the full thickness of the book, which will be free of the disadvantages of the paper cutting machines heretofore used for this class of work and which will produce a perforated book of sheets through which a spiral binder can be readily and accurately inserted.

Another object of the invention is to provide a paper drilling machine with twist drills of a novel construction which will efficiently and satisfactorily drill holes through books of paper sheets.

Another object of the invention is to provide a paper drilling machine with guide means for the drills which will exert an annular pressure about the areas to be cut by the drills so as to compress the paper sheets of the book in the areas affected into a substantially solid body.

Another object of the invention is to provide a paper drilling machine which will automatically arrange the sheets so that after they have been drilled and rearranged into book form, the holes thereof will conform to the configuration of those portions of the binder which extend therethrough and the edges thereof will be all contained in vertical planes.

Another object of the invention is to provide a paper drilling machine which will automatically feed books toward and away from the cutting drills and which will require a minimum of attention by the operator, the parts thereof being so constructed and organized that the books will be fed through the machine at a relatively high rate.

Figure 19:
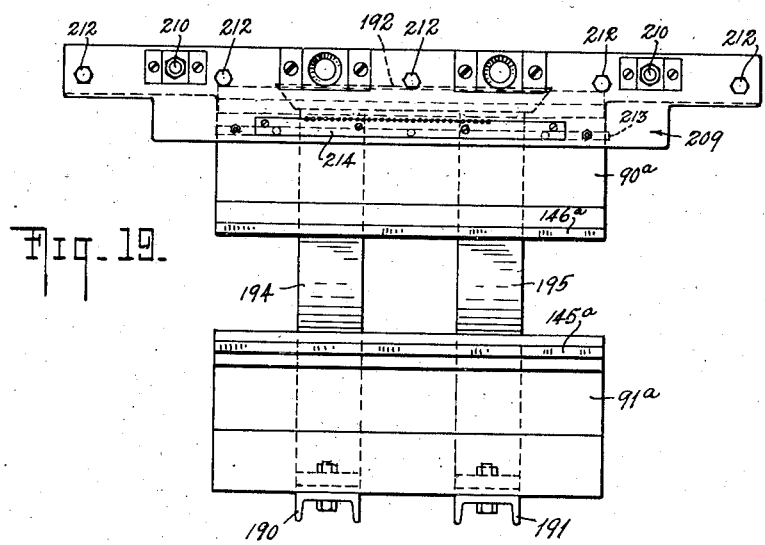
Figure 20:
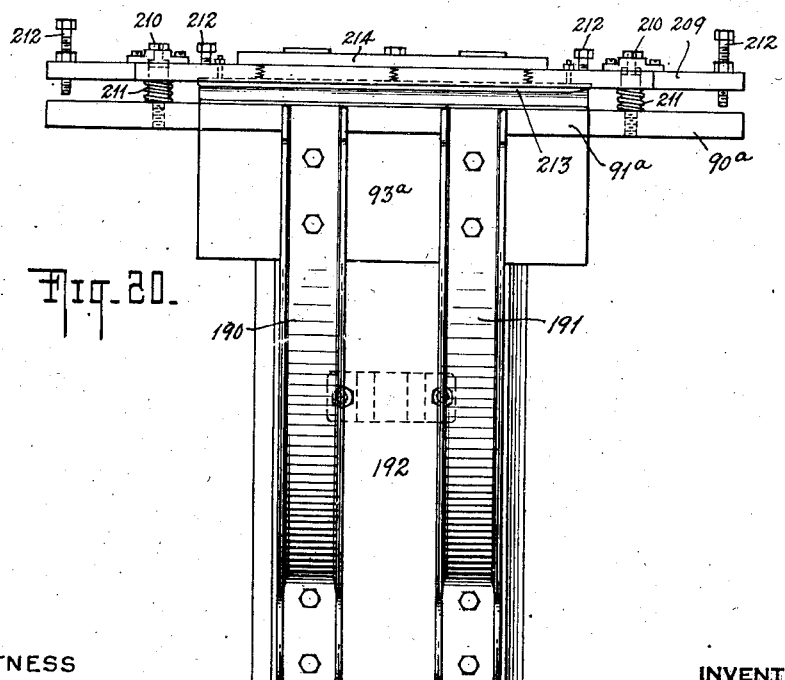
Figure 23:
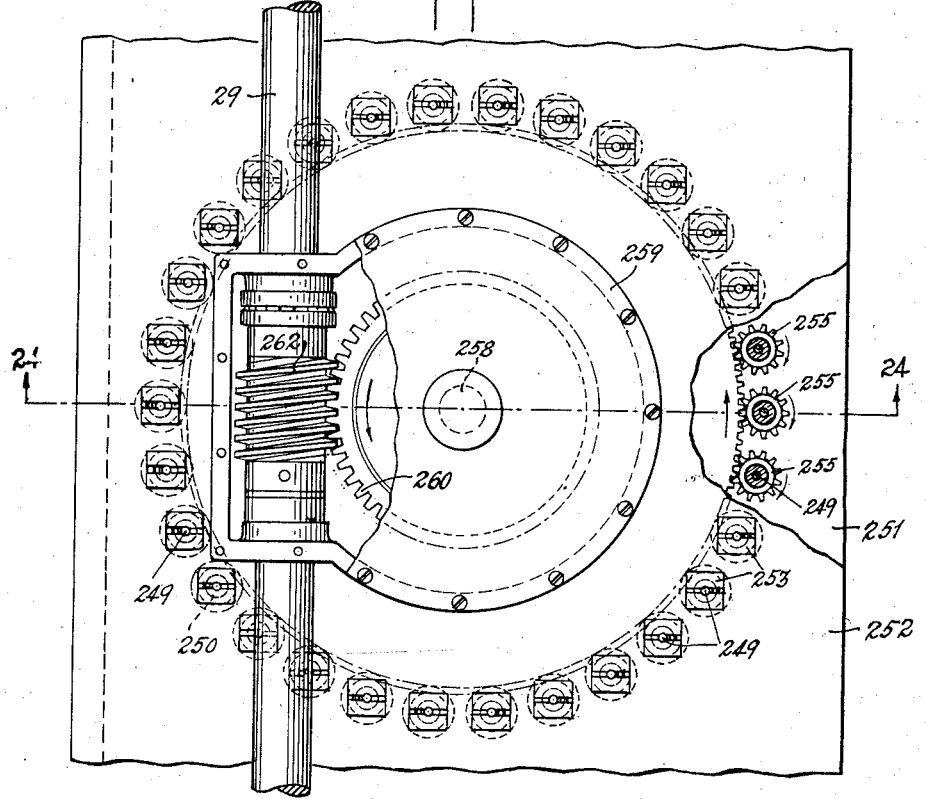
Figure 24:
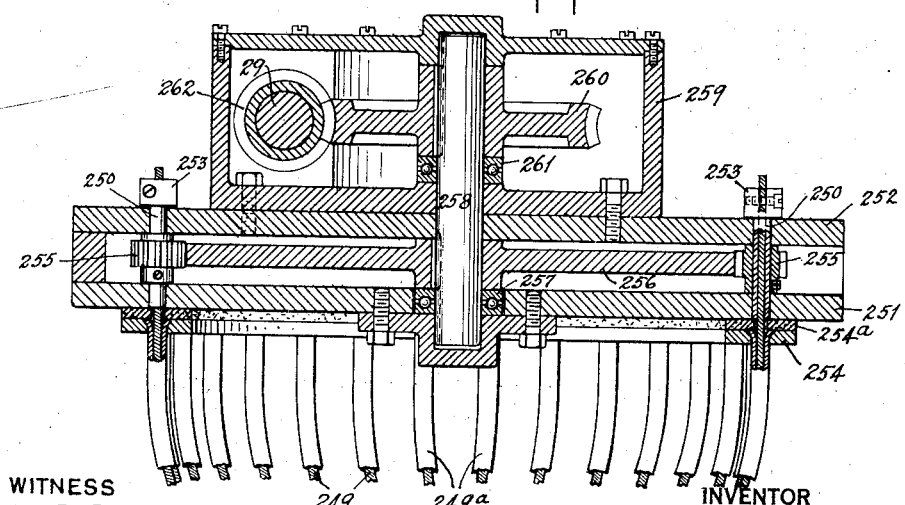

With the foregoing and other objects in view, the invention comprises the novel construction, combination and arrangement of parts hereinafter more specifically described and illustrated in the accompanying drawings wherein is shown the preferred embodiment of the invention and in which Fig. 1 is a top plan view of the entire machine; Fig. 2 is a vertical section taken along the line 2—2 of Fig. 1; Fig. 3 is a side elevation of the machine as viewed from the right of Fig. 1; Fig. 4 is a sectional view taken along the line 4—4 of Fig. 1, showing the position of the movable carriage at the completion of the drilling operation; Fig. 5 is a similar view, in section, taken along the line 5—5 of Fig. 1; Fig. 6 is a sectional plan view taken approximately along the lines 6—6 of Figs. 2 and 3 and showing the lower driving mechanism of the machine; Fig. 7 is a top plan view of the central portion of the table of the machine on an enlarged scale, showing a book in position to be drilled on the movable carriage portion; Figs. 8 and 9 are cross sectional views taken along the lines 8—8 and 9—9, respectively, of Fig. 7 showing the relation of the parts constituting the table portion of the movable carriage in their normal position; Fig. 10 is an enlarged sectional view taken along the line 10—10 of Fig. 7 showing in detail the pusher and stop mechanism; Fig. 11 is a plan view of a book illustrating the arrangement of the sheets thereof just after the drilling operation; Fig. 12 is a top plan view of the book after the sheets thereof have been straightened and a spiral binding wire threaded through the series of drilled holes to bind them together; Fig. 13 is an enlarged elevational view of one of the conveyor holders showing a stack of sheets or book in position therein; Fig. 14 is a side view of the parts shown in Fig. 13; Fig. 15 is a top plan view of the parts shown in Figs. 13 and 14; Fig. 16 is an enlarged view in side elevation of the mechanism for transferring the books from the holders to the table of the machine; Fig. 17 is a sectional view taken along the line 17—17 of Fig. 16; Fig. 18 is a sectional view taken along the line 18—18 of Fig. 16; Fig. 19 is a top plan view of the carriage frame and clamping bar; Fig. 20 is a front elevation of the structure shown in Fig. 19; Fig. 21 is a rear elevation of the central portion of the machine illustrating the movable carriage and associated mechanism for operating the clamping bar; Fig. 22 is a sectional view taken along the line 22—22 of Fig. 21 and shows a book of sheets in position to be clamped; Fig. 23 is a top plan view, partially in section on an enlarged scale, of the driving mechanism for the drills; Fig. 24 is a sectional view taken along the line 24—24 of Fig. 23; Fig. 25 is an enlarged sectional view showing the relation of a portion of the table of the movable carriage and the associated drilling mechanism at the completion of the drilling operation; Fig. 26 is a plan view taken along the line 26—26 of Fig. 25 showing the arrangement of the guide bushings and guide bar on the table of the movable carriage; Fig. 27 is a front elevational view, greatly enlarged, of one of the drills and a portion of the drill holder, partly in section; Fig. 28 is a side elevation of the bottom portion of the drill shown in Fig. 27; Fig. 29 is an enlarged detail view in section showing the manner of holding the sheets of the book in proper arrangement during the drilling operation; Fig. 30 is a sectional view taken along the line 30—30 of Fig. 29; Fig. 31 is a side elevation of the top portion of a book drilled in accordance with the invention and with the spiral binding in place; Fig. 32 is a partial top plan view of the filler illustrated in Fig. 31; Fig. 33 shows the bottom portion of a modified form of drill; Fig. 34 shows the bottom portion of another form of drill made in accordance with the invention; and Figs. 35 and 36 are bottom end views of the drills illustrated in Figs. 33 and 34, respectively.

Before taking up the detailed description of the machine illustrated in the drawings, it is believed advisable in order to facilitate an understanding of the invention, to first consider the construction of the loose leaf binder for the manufacture of which such machine was devised. The type of loose leaf binder concerned is illustrated in Figs. 12, 31 and 32 of the drawings, and comprises a stack of sheets 1 and outer sheets 2 of heavier paper than the sheets 1 which constitute the book. The sheets 2 may be of the same size as the sheets 1, as shown in the drawings, so that they form covers for the latter or they may be made from narrow strips of paper so that they cover only a portion of the surfaces of the book of sheets 1 and constitute binder strips. For the purposes of convenience, the stack of sheets 1 with or without the sheets 2 will hereinafter be referred to as a book. Along one edge of the book is a row of closely related holes 3 through which is passed a spirally shaped wire 4. The closely related holes 3 which may be as small as $\frac{3}{54}$ of an inch or even smaller in diameter, are each, considering the book as a unit, arcuately shaped when viewed in section in the direction of the central axis of the spiral wire 4, as is shown in Fig. 31 and obliquely disposed when viewed in section transversely of such axis as is shown in Fig. 32. By constructing the holes 3 in this manner the side edges of all the sheets constituting the book will be maintained in vertical planes by the spiral wire 4. The manner of drilling the holes to produce this result will be readily apparent from the following description.

Considering now in a general manner the embodiment of the invention illustrated in the drawings, the books which may consist simply of a plurality of thin paper sheets or include binder strips or cover sheets, as has been above indicated, and which are each to be provided with a row of holes such as above described, are fed by the operator at the station designated A in Fig. 1 of the drawings, to the vertically disposed holders B which are hingedly mounted on a conveyer chain C. The binding or top edges of the books are inserted foremost in the holders and positioned against a concavely grooved plate provided in the lower end of the holders to arrange the sheets at the binding or top end of the books in a convex fashion. The conveyer chain C moves in a step-by-step fashion in the direction of the arrow and during such travel of the conveyer each loaded holder comes into engagement with a cam which tilts it toward the front of the machine. When a loaded holder reaches the station designated D it has been tilted so that the book is substantially parallel to a guide plate E and at this station during the period of rest of the conveyer C, transfer mechanism come into operation to strip the book from the holder and slide it over the guide plate E onto the table F of the machine and over a chain conveyer G positioned between the spaced plates forming such table. A pusher H carried by the chain conveyer G thereupon engages with one side edge of the book and under the influence of the conveyer pushes the book along the table and onto a movable portion I of the table disposed in the central portion of the machine. During this pushing movement the book engaging plate of the pusher H which is inclined outwardly from the vertical, shifts the sheets in the book so that they become stacked in an inclined fashion. As a result of these operations the sheets of the book are arranged so that the top and bottom ends of the book are arcuately shaped while the side edges are inclined. After the book has been deposited on the movable portion I of the table, against a stop plate J, mechanism are operated to clamp the top portion of the book and to lift such portion I to bring the clamped upper portion of the book into engagement with a row of drills driven through flexible shafts from the drill head K. Upon completion of the drilling operation, the movable table portion or carriage I is brought down to the level of the stationary table portions of the machine and then after the stop plate J has been lifted upwardly out of engagement with the side of the book the conveyer G comes into operation to remove the drilled book off the movable table portion I and onto the stationary table portion to the left of the machine, as viewed in Fig. 1, whereupon the drilled book can be removed by the operator or fed to suitable mechanism for inserting the spiral binding in the drilled holes of the book.

Referring now more particularly to the drawings in which the same reference characters indicate the same parts in the several views, the frame or body of the machine is indicated generally by the reference character 5. Mounted on the rear right-hand side of the machine body 5, as viewed in Fig. 1, is the loading chain conveyer C which comprises an endless chain 6 carried by spaced horizontally disposed sprocket wheels 7 and 8. The sprocket wheel 7 is secured to a vertically disposed shaft 9 (see Fig. 2) which is rotatably supported by the spaced bearing brackets 9a and 9b secured to longitudinal beams at the rear of the machine body. A thrust bearing 9c positioned intermediate the sprocket wheel 7 and bearing bracket 9a facilitates the rotational movement of the shaft 9. The sprocket wheel 8 is connected to a vertically disposed shaft 10 which is rotatably supported through a thrust bearing 10a by a bearing bracket 10b, the latter of which is secured to the upright channel beam 11 of the machine body. The endless chain 6 travels in a horizontal plane and comprises a plurality of upper connecting links on every other one of which is secured a hinge bracket 12 having spaced bearing supports through which extends a pin 13 (see Figs. 13 to 15). Mounted on the outer ends of the pin 13 are the hinge members 14, 14, depending from the base plate 15 of a holder B. Secured to each side of the base plate 15 at their lower ends, as by means of rivets, are the spaced plates 16 and 17 between which the book is inserted at the loading station A, the upper ends of such plates being flared outwardly to facilitate this operation. The upper surface of the base plate 15 is concavely shaped in cross section, as is shown more clearly in Fig. 14, so that when the upper end of the book is inserted thereagainst by the operator the top ends of the sheets which constitute the book are arranged in a convex fashion. As will be observed more clearly in Fig. 13, the plates 16 and 17 have a width less than the width of the book and in order to maintain the side edges of the sheets of the book in proper arrangement and to facilitate the transfer of the book from the holder, a transverse bar 18 is secured to the upper end of the plate 16, such bar being materially longer than the width of the plate 16 so that its ends project outwardly therefrom and the outer ends of which are bent towards the plate 17 to span the space between the plates 16 and 17.

Mounted on the plate 16 by means of spaced lugs 20, 20, is a vertically disposed roller 19 arranged to engage with a guide rail 21 under the tension of a coil spring 22 mounted on the pin 13 intermediate the bearing supports of the hinged bracket 12 and having one end bearing against the hinged bracket 12 and its other end engaging with the plate 17 of the holder B. The guide rail 21 which is formed in an endless fashion is positioned adjacent to and within the confines of the endless chain 6, being supported at one end by a U-shaped bracket 23 mounted on the upper end of the vertically disposed shaft 9 and at its other end by a U-shaped bracket 24 mounted on the vertically disposed shaft 10. Intermediate the U-shaped brackets 23 and 24 is provided a U-shaped spacer bar 25 for maintaining the sides of the guide rail in parallel arrangement. Mounted upon the guide rail 21 is an elongated horizontally disposed cam member 26 (see Figs. 1 and 14) arranged so that the rollers 19 of the holders B ride on the outer cam surface thereof, as such holders approach the transfer station D, to tilt the holders forwardly against the tension of their springs 22. The cam 26 is so formed that when a holder reaches the transfer station D the holder is tilted to the position illustrated in Figs. 2 and 14 of the drawings, in position to enable transfer mechanism to transfer the book from the holder over the guide plate E and onto the table F of the machine, the latter two of which are disposed at an angle of approximately forty-five degrees from the vertical as can be seen more clearly in Figs. 2 and 3 of the drawings.

The chain conveyer C is driven in a clockwise direction, as viewed in Fig. 1 of the drawings, by a motor 27 which is connected to such conveyer through a shaft 29 extending across the drill head K and rotatably mounted on a pair of spaced bearing brackets 29a and 29b secured to the top surface of the obliquely disposed top plate 252 of the drill head and connected at one end to the motor shaft 28 by the detachable coupling members 30, 30. The shaft 29 is connected at its other end, by means of the detachable coupling members 31, 31, to a shaft 32 projecting from one side of a housing 33 containing reduction gear mechanism. The gearings in the reduction gear housing 33 are arranged so that the rotational movement imparted to the shaft 32 by the motor 27 is reduced in the ratio of a hundred to one, such reduced rotational movement being imparted to a shaft 34 projecting from the other side of the reduction gear housing 33 (see Fig. 1). Mounted on the outer end of the shaft 34 is a sprocket wheel 35 with which is engaged one end of an endless chain 36 which extends downwardly in a substantially vertical direction at the rear of the machine (see Fig. 3) and is connected at its other end to a sprocket wheel 37 secured to a horizontally disposed shaft 38 (see Fig. 6). The shaft 38 is rotatably supported at its ends by a pair of spaced bearing brackets 39, 39, which are secured to upright channel members provided at the rear of the body of the machine. Also provided on the shaft 38 is a sprocket wheel 40 carrying one end of an endless chain 41 whose other end is carried by a sprocket wheel 42 mounted on a shaft 43 extending longitudinally of the body of the machine intermediate the front and rear ends thereof, as is shown in Fig. 6. The shaft 43 is rotatably supported at one end by a bearing 44 which is mounted on the top of a cross frame 45 and at its other end by a pair of bearings 46, 46, which are secured to the under sides of obliquely disposed members of the cross frames 47 and 54 positioned at the right-hand side of the machine, as is shown in Figs. 3 and 6 of the drawings. Secured to that portion of the shaft 43 which is disposed intermediate the bearings 46, 46, is a disc 48 provided with a driver or actuating arm 48a arranged to engage with a Geneva wheel 49 mounted on the longitudinally extending shaft 50, such actuating arm 48a and Geneva wheel 49 constituting the members of the well known Geneva movement and functioning to impart to the shaft 50 a step-by-step rotational movement. The shaft 50 is rotatably supported at its ends by the bearings 51 and 52 mounted on the cross frames 53 and 54, respectively, and intermediate its ends by the bearings 55 and 56 mounted on the bracket 57 and the cross frame 47, respectively (see Fig. 6). Secured to the shaft 50 adjacent to the bearings 51 is a bevelled pinion 58 which engages with a bevel gear 59 attached to the forward end of a transversely extending shaft 60. The shaft 60 is rotatably supported on a pair of spaced bearings 61, 61 which are mounted on the upper surface of an offset portion of the cross frame 53 and is provided at its rear end with a bevel gear 62 which engages with a bevelled pinion 63 mounted on the shaft 9 below the bearing bracket 9a, as is shown more clearly in Fig. 2. Thus the step-by-step rotational movement of the shaft 50 is imparted through the gears 58, 59, 62 and 63 to the shaft 9 which carries the sprocket wheel 7 of the endless chain conveyer C and through the sprocket wheel 7 to such conveyer. The step-by-step movement of the chain conveyer C and of the holders B thereof is correlated to the step-by-step movement of the chain conveyer G and the operations of the transfer mechanism so that the latter take place during the periods of rest of such step-by-step movements, as will hereinafter become more apparent.

It will be evident from the foregoing that when a holder B is brought to rest at the station D, in the step-by-step movement of the conveyer C, such holder is tilted forwardly by the cam 26 at an angle of approximately forty-five degrees from the vertical and is disposed so that the plate 17 thereof is substantially in alignment with the obliquely disposed guide plate E whose rear end is closely adjacent to the outer end of the plate 17 in this position of the holder, as can be clearly seen in Figs. 2 and 3. During the period of rest of the conveyer, transfer mechanism comes into operation to discharge the book from the holder onto the aligned guide plate E and across the latter to the work table F which is also inclined rearwardly at an angle of approximately forty-five degrees. The mechanism for accomplishing this purpose comprises a pair of transfer members 70 which are spaced apart for a distance at least as great as the width of the plate 17 of the holder (see Figs. 16 to 18) and have a slot 71 formed in their forward ends adapted to receive the upper end of the book which is positioned lowermost in the holder B. The slots 71 are concavely shaped at their interior surfaces in a manner similar to the top surface of the base plate 15 of the holder so that in the engagement of the transfer members 70 with the top end of the book in the holder, the arrangement of the sheets constituting such book is not disturbed. The transfer members 70 are mounted on the upper ends of rods 72 which extend through cylindrically shaped lug members 73 provided on the upper surfaces of a pair of spaced plates 74, 74, the latter of which are provided with recesses along their opposed faces adapted to slidably receive the side edges of an obliquely disposed rail 75 and are connected together by the cross plates 74a so that they constitute a sliding block. Extending transversely through each of the plates 74, is a spring pressed plunger 74b adapted to engage with an indentation provided in the outer edge of the rail 75 when the sliding block formed by such plates is in its retracted or normal position. The purpose of the spring pressed plungers 74b is to retard the forward movement of the block until the transfer members 70 are raised into position in back of the book, as will be hereinafter more fully explained. The lower projecting ends of the rods 72 are connected by a cross bar 76 which normally is positioned as shown in full lines in Figs. 16 and 18 of the drawings, so that the transfer members 70 are in engagement with the upper ends of the cylindrical lug members 73 and below the path of movement of the holders B as will be apparent in Figs. 2, 3 and 16 of the drawings. The cross bar 76 includes three depending bearing or hinge supports through which extend a pin 77 and intermediate which are positioned the rear ends of a pair of bell crank levers 78, 78, through which the pin 77 also extends. The bell crank levers 78 are mounted for pivotal movement on a pin 79 which is supported by the spaced brackets 80, 80 depending from and attached to the under surfaces of the sliding block plates 74, 74, and at their forward ends are connected to the outer ends of and carry a pin 81. Rotatably connected to the pin 81 intermediate the forward arms of the bell crank levers 78, is one end of a link 82 whose other end is attached to the upper end of a transfer arm 83. The transfer arm is pivotally supported at its lower end by a bracket 84 which is attached to the front beams of the machine body, as is shown more clearly in Figs. 2 and 3 of the drawings, and is connected intermediate its ends by means of a link 85, to the forward end of a cam lever 86, the other or rear end of such lever being rotatably mounted upon the intermittently movable shaft 50. Intermediate the ends of the cam lever 86, is provided a cam roller 87 which engages with the cam groove of an internal cam 88 secured to the continuously revolving shaft 43. The groove of the cam 88 has the form indicated in dotted lines in Fig. 2 of the drawings, the roller 87 being shown in its lowermost position to maintain the several parts comprising the transfer mechanism in their retracted positions while a holder is being moved into position at the station D for transfer of the book contained therein. Soon after the holder comes to rest at station D, the cam roller will start to ride up on the cam surface 88a, thereby causing the cam lever 86 to be pivoted upwardly about the shaft 50 in a clockwise manner, as viewed in Fig. 2, and in turn causing the transfer arm 83, through the link 85, to rotate on its supporting bracket 84 in a counter clockwise or forward direction. Due to the fact that the spaced plates 74, 74 forming the sliding block are detachably connected to the guide rail 75 by the pair of spring pressed plungers 74b, as has been previously described, the initial rotative movement of the transfer arm 83 will, through the link 82 operate to cause the bell crank levers 78, 78 to be rotated to the position shown in dotted lines in Fig. 16 of the drawings, to raise the cross bar 76 thereby positioning the transfer members 70 directly in back of the projecting end portions of the book in the holder B. On continued pivotal movement of the transfer arm 83 as the cam roller 87 rides up on the cam surface 88a of the cam 88, the tension of the springs of the plungers 74b will be overcome and the sliding block comprising the spaced plates 74, 74 will be moved upwardly on the inclined rail 75 towards the front of the machine, the transfer members 70 during such movement being brought into engagement with the upper end of the book in the holder B and functioning to transfer such book from the holder across the guide plate E and onto the obliquely inclined work table F, as is shown in Fig. 1 of the drawings, the transfer members 70 being shown in such figure at the end of their forward movement. The cam 88 thereupon operates through the mechanism above described, to bring the sliding block and the holders 70 carried thereby back to their starting position whereupon the spring pressed plungers 74b will again engage with the recesses in the side edges of the rail 75 so that in the last portion of the pivotal movement of the transfer arm 83, the bell crank levers 78 will be pivoted to withdraw the transfer members 70 into engagement with the cylindrical lug or stop members 73 and out of the path of movement of the next succeeding holder which will be moved into position on the next step-by-step movement of the chain conveyer C.

The work table F upon which the books are deposited by the transfer mechanism, is inclined upwardly and forwardly at an angle of approximately forty-five degrees so that the books deposited thereon will bear against a longitudinal guide positioned along the rear edge of the table and adapted to maintain the sheets of the books in the manner in which they were arranged in the holders B, at least until the holes for the spiral bindings therefor have been drilled. The top of the work table is comprised of a pair of spaced table members arranged in sections and extending in parallel relation longitudinally of the machine, one of said table members comprising the aligned plate sections 90, 90a, and 90b, as is shown more clearly in Fig. 1 of the drawings, and the other of said members comprising the aligned plate sections 91, 91a and 91b, the parallelly disposed intermediate plate sections 90a and 91a constituting part of the movable carriage I which will hereinafter be more fully described. The several plate sections 90, 90a, 90b, 91, 91a and 91b are mounted on longitudinally disposed angle plates 92, 92a, 92b, 93, 93a and 93b, respectively (see Figs. 2, 4 and 5). The rear angle plates 92 and 92b are secured at their inner ends to the spaced obliquely inclined supporting strips 94 and 95, respectively, the latter of which are attached at their lower ends to a pair of foot blocks 96, 96 mounted on the front portion of the body of the machine and intermediate their ends to the spaced plates 97 and 98 which are disposed in oblique fashion, one about the other and in parallel relation, as is shown more clearly in Figs. 2 and 21. The plates 97 and 98 are further secured to a pair of obliquely disposed strips 99 and 100 which incline upwardly and rearwardly from the forward end of the machine and which have at their upper ends offset portions 99a and 100a, respectively, to which are secured, respectively, the obliquely disposed cross frames 101 and 102 (see Figs. 1, 2 and 4). The cross frames 101 and 102 are supported at their rear ends on offset portions of the rear columns 103 and 104 of the machine and on a longitudinally extending channel beam 105 which braces the rear columns 103 and 104. The forward ends of the obliquely inclined cross frames 101 and 102 are provided with depending legs 101a and 102a, respectively, which are attached to the offset upper ends of the front columns 106 and 107, respectively. The front angle plates 93 and 93b are secured at their inner ends with the depending legs 101a and 102a, respectively, to the front columns 106 and 107, respectively. The outer ends of the parallelly arranged angle plates 92 and 93 are connected together by a cross tie rod 108, while the outer ends of the parallelly arranged angle plates 92b and 93b are rigidly connected together by means of the cross tie rod 109 (see Fig. 1 of the drawings). The manner of supporting the angle plates 92a and 93a will be described more fully in the following discussion of the movable carriage I.

Extending longitudinally of the machine in the space between the above described parallelly disposed table members, one of which comprises the plate sections 90, 90a and 90b and the other of which comprises the plate sections 91, 91a and 91b, is disposed the conveyor G comprising the chain 115 which is supported at one end of the machine by a sprocket wheel 116 and at the other end of the machine by a sprocket wheel 117 (see Fig. 1). The sprocket wheel 116 is mounted on a transverse shaft 118 which is rotatably supported at its ends by the bearing members 119 and 120 mounted on the lower legs of the bracket members 121 and 122, repectively, as is shown more clearly in Fig. 5. The upper legs of the bracket members 121 and 122 are secured as by bolts to the under sides of the angle plates 93b and 92b, respectively. The sprocket wheel 117 in a like manner is mounted on a shaft 123 which is rotatably supported by the bearing members 124 and 125 mounted on the lower legs of the bracket members 126 and 127, respectively, the upper legs of which are fixedly attached to the under surfaces of the angle plates 93 and 92, respectively (see Fig. 3 of the drawings). The shaft 123 is connected by means of a universal coupling 128 to one end of a shaft 129 which is rotatably supported adjacent its other end on a bearing 130 mounted on the cross frames 47 and 54 of the machine and has attached to such end a pinion 131 which engages with a bevel gear 132 mounted on the shaft 50 as is clearly shown in Figs. 1 and 3 of the drawings. A step-by-step movement is therefore given the chain 115 through its driving connection with the intermittently revolving shaft 50.

Mounted on the chain 115 at ten inch intervals, are sixteen pairs of spaced transversely disposed brackets 135, 135, each pair of brackets being secured intermediate its ends on each side of the chain 115 by means of the cross bolts which connect the links of the chain together, as is shown more clearly in Fig. 9 of the drawings. The bottom ends of the brackets in each pair are provided with rollers 136, 136 which extend inwardly in opposed relation and which engage with side grooves provided in a longitudinally extending rail 137 mounted upon and bolted to the cross tie rods 108 and 109. The upper ends of the brackets 135 of each pair are offset in outwardly opposed relation and each of such offset portions is provided with an opening through which extends a bolt 138. The heads 139 of the bolts of each pair of brackets are provided with aligned transversely extending openings through which extends a shaft 140. Mounted on the shank of each of the bolts 138 intermediate the upper offset portion of its associated bracket 135 and a flat sided washer 142 secured on the lower end of the bolt shank by means of a nut, is a compression spring 141 which tends to maintain the head 139 of the bolt in engagement with the upper surfaces of the offset portion of its associated bracket 135. Mounted on the shaft 140 adjacently to the outer ends of the heads 139 of the bolts are a pair of spaced rollers 144, 144 which ride on tracks 145 and 146 provided on the top of the table and extending longitudinally of the machine adjacent to the inner opposed edges of the plate sections. The tracks 145 and 146 are dimensioned so that the under surfaces of the heads 139 of the bolts are maintained just free of engagement with the upper surfaces of the offset portions of the brackets 135. Intermediate the spaced heads of the bolts 138 is positioned a cylindrical spacer member 147 through which the shaft 140 extends and which is attached to the central lower portion of an angularly disposed pusher plate 148 (see Figs. 9 and 10). The upper edge portion of the pusher plate 148 normally rests against the outer end of a set screw 149 threadedly connected with an upwardly extending portion of a cross plate 150 which is secured at its outer ends to the heads 139 of the bolts 138. Mounted on the front and rear ends of each plate 148 are a pair of brackets 160, 160 which extend from the upper portion of such plate rearwardly around the shaft 140 and at their lower ends are provided with rollers 161, 161, such brackets being arranged on the plate 148 so that the rollers 161, 161 during their passage over the plate sections 90 and 91 ride over the central longitudinally extending grooves 162 and 163 provided in the plates 90 and 91, respectively, but out of contact with the bottom surfaces of such grooves so that they perform no function at this portion of the machine. The front or left end of the plate 148, as viewed in Fig. 9, is provided with a transversely extending offset end portion or shoe 164 which engages with a latch member to maintain the rollers 144 in engagement with their associated tracks during the drilling operation, as will hereinafter be explained, but which during its passage over the plate section 91 performs no function, merely riding in the groove 163 of such plate without engaging with the interior surfaces thereof, as is shown in Figs. 9 and 10 of the drawings. The rear or right-hand end of the plate 148 is provided with a rearwardly extending portion 165 of reduced dimensions to enable parts of the machine to perform their functions during the drilling operation but, like the offset portion 164, performs no function during its passage over the plate section 90, merely riding just above but not in contact with the longitudinally extending rail 166 provided intermediate the front and rear edges of the plate section 90 and flush with the rear edge of the groove 163 thereof.

From the foregoing description it will become apparent that as the chain 115 moves longitudinally of the machine in a step-by-step fashion, the pusher plates 148 mounted thereon will be brought over the right-hand end of the machine in succession and will pass with a step-by-step movement over the table plate sections 90 and 91, 90a and 91a and 90b and 91b, such plates 148 spanning the central opening between such parallelly disposed plates as is clearly shown in Fig. 1 of the drawings. The plates 148 are so arranged on the chain 115 that in their passage over the plate sections 90 and 91 they come to rest at a point just prior to that portion of the plate sections upon which the book is deposited by the transfer mechanism (see Fig. 1). When the transfer mechanism has deposited a book on the rails 145, 146 and 166 of the plate sections 90 and 91, and has been withdrawn, a plate 148, on the next step-by-step movement on the chain 115, will come into engagement with one side of the book and push it along the said rails 145, 146 and 166 towards the movable carriage I of the machine. Due to the fact that the plate 148 is inclined, the sheets of the book will be rearranged during this pushing movement so that their edges are inclined in the same direction as the plate 148. In the embodiment of the machine illustrated, the plates 148 are inclined at an angle of approximately ten degrees from the vertical, so that the side edges of the books will be inclined at such angle. Along the rear edge of the plate section 90 and to the left of the plate where the book is deposited on such plate section, as viewed in Fig. 1 of the drawings, is provided a guide 167 with which the top end of the book engages during its movement toward the movable carriage I of the machine, such guide 167 being concavely shaped at its book engaging surface in the same manner as the transfer members 70 and the base plate 15 of the holders B to maintain the curved arrangement of the ends of the sheets. As has been previously mentioned, the upper ends of the books will maintain their engagement with the guide 167 during their passage over the plate sections 90 and 91 due to the fact that the work table of which such plate sections form a part, is inclined at an angle of forty-five degrees from the vertical. The book therefore will have the sheets arranged in their passage over such plate sections so their bottom and top edges are arcuately arranged and their side edges are inclined with respect to the vertical. In the step-by-step movement of the chain 115 the book with its sheets thus arranged passes from the stationary plate sections 90 and 91 of the work table and onto the plate sections 90a and 91a of the centrally disposed movable carriage I, the pusher plate 148 coming to rest when the other or left-hand edge of the book, as viewed in Fig. 1, is brought against the face of the plate 168 of the stop J which extends transversely across the plates 90a and 91a and is inclined in parallel relation to the plate 148, as is shown in Figs. 7 and 10 of the drawings.

The stop plate 168 is secured to a pair of end brackets 169, 169 having aligned open holes through which extends a rod 170. The brackets 169, 169 are secured to the rod 170 by means of the vertical bolts 171, 171 which extend across the slot of the open hole and bind the split portions of such brackets together against the rod 170. Attached to the forward end of the rod 170 is a narrow supporting plate member 172 which projects forwardly from the forward end of such rod and has attached thereto one end of a pair of link members 173 and 174. The other ends of the link members 173 and 174 are pivotally connected to an outwardly extending arm or bracket 175 secured to the angle plate 93a of the movable carriage I. The link 174 which is in the nature of a bell crank lever, is provided with a depending fork-shaped portion 177 which straddles a longitudinally extending bar 178 (see Figs. 1 and 8) disposed in front of the machine and supported by a pair of vertically disposed arms 179, 179, pivotally supported at their lower ends by brackets 180 attached to the foot of the machine (see Fig. 4). The arms 179, 179 are connected intermediate their ends by a cross bar 181 to which is connected one end of a lever arm 182. The other end of the lever arm 182 carries a cam roller 183 which engages with the outer cam surface of a cam 184 mounted on the continuously rotating shaft 43. The roller 183 is maintained in engagement with the cam surface of the cam 184 through a supporting link 185 which is connected at its upper end to the lever arm 182 and at its lower end to the foot of the cross frame 45, and a tension spring 186 which is connected at one end to the supporting link 185 and at its other end to a rear portion of the frame 45. By reason of this arrangement of the stop plate 168 with respect to the movable carriage and the driving mechanism, the plate will remain in engagement with the top surfaces of the plate sections 90a and 91a throughout the sliding movement of the movable carriage I, the sliding connection between the fork-shaped portion 177 of the link 174 and the longitudinally extending bar 178 permitting such movement without disturbing the stop plate 168. The stop plate 168, however, can be removed out of the path of the book and the pusher plates 148 by pivoting the arms 179, 179 inwardly toward the body of the machine to cause the link 174 to function as a lever to lift the plate member 172 and bar 170, the link 173 functioning during this operation to maintain the parallel relation of the stop plate with the top surfaces of the plate sections 90a and 91a. The cam 184 which controls the pivotal movement of the arms 179, 179, is arranged to cause such pivotal movement after the carriage I has returned to position at the end of the drilling operation and just prior to the next step-by-step movement of the chain 115 whereby the pusher plate 148 in engagement with the drilled book will push the book off the plates 90a and 91a of the movable carriage and onto the stationary table plate sections 90b and 91b (Figs. 1, 7 and 10).

The movable carriage I includes, as has been previously mentioned, the spaced rear and front table plates sections 90a and 91a and the rear and front angle plates 92a and 93a upon which such plate sections are mounted. The front angle plate 93a is secured, as by bolts, to the upper ends of the front arcuately shaped columns 190 and 191 which form part of the frame of the carriage (see Figs. 19 to 22), while the rear angle plate 92a is secured to a sliding back plate 192 which rests on the inclined and parallelly disposed longitudinal plates 97 and 98. The plate 192 is provided with bevelled side edges which are slidably engaged with the bevelled edges of a pair of inclined guide strips 196 and 197 secured to the upper surfaces of the plates 97 and 98 (see Figs. 21 and 22). The arcuately shaped columns 190 and 191 are also secured at their bottom ends to the lower end portion of the sliding back plate 192. Intermediate the depending flanges of the two angle plates 92a and 93a are a pair of transversely disposed U-shaped tie bars 194 and 195, the former of which is secured between the plate 192 and the front upright 190 while the latter is secured between such plate 192 and the forward upright 191 (see Figs. 19 and 22). The movable carriage I which is thus constituted of the table plate sections 90a and 91a, angle plates 92a and 93a, tie bars 194 and 195, front columns 190 and 191 and the sliding back plate 192, is slidably moved on the longitudinal plates 97 and 98 and between the guide strips 196 and 197 through a link 198 (see Figs. 4 and 22) which is secured at its upper end to a bracket 199 attached to the rear surface of the plate 192 intermediate the spaced longitudinally disposed plates 97 and 98 and at its lower end is connected to the forward end of a transversely extending cam lever 200 which is pivotally supported at its rear end by a bracket 201 mounted on a horizontally disposed channel beam at the rear of the machine, as is shown more clearly in Figs. 4 and 5 of the drawings. The cam lever 200 is provided intermediate its ends with a cam roller 202 which rests upon a vertically disposed cam 203 connected to the continuously rotating shaft 43. The connection between the link 198 and cam lever 200 is through an elongated slot provided on the lower end of the link 198 and a pin carried on the forked end of the cam lever 200 so that in the initial upward movement of the cam lever 200 by the cam 203, the cam lever does not function to lift the movable carriage, such movement instead being used to bring into operation mechanism for clamping the top end of the book during the sliding movements of the movable carriage.

When a book has been delivered to the movable carriage I, the sheets thereof are maintained in the positions given them on the stationary plate sections 90 and 91 by means of the pusher plate 148, the stop plate 168 and the section 167a of the rear guide rail against whose concavely shaped surface the top end of the book bears, as is shown more clearly in Fig. 25, due to the angular disposition of the carriage plate sections 90a and 91a. The guide rail section 167a is connected to the rear table plate section 90a by means of an angle iron 188 which is fixedly secured to the table plate section 90a and is provided with enlarged openings through which extend screws 189 secured to the guide rail section 167a so that the latter is enabled to move relative to such angle iron 188. Disposed beneath the guide rail section 167a and contained in a longitudinally extending recess provided in the upper surface of the plate section 90a is a rubber strip 204 which serves as a cushion against impacts and also maintains the guide rail 167a in position to enable the book to be properly seated against the concavely shaped surface of the section 167a before the book is compressed by the rows of guide bushings 206 and 208, and when the book is compressed such rubber strip 204 enables the section 167a to be lowered under the influence of a clamping plate 209 during the clamping action, thereby maintaining an exact relation to the book under compression as well as when not under compression. Immediately in front of the guide rail 167a and extending longitudinally of the plate section 90a is a row of apertures 205 which extend transversely through the plate section 90a and communicate at their lower end with a slot provided in the portion of the angle plate 92a disposed therebeneath. Mounted in the upper ends of the apertures 205 are a row of guide bushings 206 adapted to receive the lower ends of the drills 207 which are arranged in a row thereabove. Disposed above the row of guide bushings 206 is a second row of guide bushings 208 each of which is positioned directly above and in alignment with a guide bushing 206. The upper guide bushings 208 are appreciably longer than the lower guide bushings 206, as is shown more clearly in Fig. 25 of the drawings, and extend up through and are frictionally held in a row of openings provided in a longitudinally disposed clamping plate 209 and into approximate engagement at their upper ends with the under surface of a rearwardly extending flange formed on a guide bar 214 which is connected to the upper surface of the clamping plate 209. The rear edge of the flange on the guide bar 214 is provided with a series of semicircular guide recesses 214a, each of which is in alignment with the bore of one of the bushings 208 and through which extend the shank portions of the drills 207, as can be clearly seen in Fig. 25 of the drawings. The clamping plate 209 which is disposed lengthwise along the rear edge portion of the table plate section 90a of the movable carriage, is supported in spaced relation thereto, as is more clearly shown in Fig. 20, by means of a pair of bolts 210 which extend down through openings in the plate 209 and are in threaded engagement at their lower ends with the table plate section 90a and the compression springs 211 which are positioned on such bolts intermediate the plate section 90a and the plate 209, such springs 211 normally tending to maintain the plate 209 in its uppermost position against the heads of the bolts 210. The plate 209 is limited in its movement towards the plate section 90a by a plurality of adjustable stop bolts 212 which are threadedly engaged in spaced relation the plate 209 and contact at their lower ends with the top surface of the table plate 90a in the lowermost position of the plate 209. Provided along the forward edge portion of the plate 209 is a spring pressed bar or shoe 213 which is adapted to engage the book in the region of the rail section 166a as it is moved onto the movable carriage I to initially press the pages of the book together before the bushings 206 and 208 come into clamping engagement with the upper end of the book (see Figs. 20 and 25).

From the foregoing description it will be understood that the plate 209 is normally maintained in its uppermost position by the springs 211, as is shown in Figs. 2 and 3, so that the parts carried thereby will offer no obstructure to the passage of a book over the row of lower bushings 206, the guide rail section 167a maintaining the convexly arranged relationship of the sheets at the top end of the book during such movement. When the book comes to rest over the bushings 206 on the next idle period of the chain conveyer G and in proper position to be drilled, the plate 209 is moved downwardly against the tension of the springs 211 bringing the upper row of guide bushings 208 into engagement with the top surfaces of the book to tightly clamp the upper end of the book between them and the lower bushings 205 so that in the lowermost position of the plate 209, see Fig. 25, the upper end of the book is tightly clamped between the track section 166a and the spring pressed bar or shoe 213 and the aligned rows of bushings 205 and 208. The downward movement of the plate 209 also depresses the guide section 167a to approximately the level of the upper surface of the plate section 90a, as is shown in Fig. 25, and confines the rearwardly projecting portion 165 of the pusher plate 148 between it and the track section 166a. The other or forward end of the pusher plate 148 has already been latched to the front plate section 91a of the movable carriage by the offset portion 164 of the pusher plate interengaging with a latch member 187 (see Figs. 1 and 9) as the pusher plate 148 moved the book into drilling position between the guide bushings 205 and 208.

The mechanism for causing the downward movement of the plate 209 comprises a pair of spaced cam straps 216 which encircle eccentric cam members 218, 218 pivotally connected to the upper rear portion of the plate 192 at 193, 193 (see Fig. 21). Each of the straps 216 has an arm 215 extending upwardly through enlarged openings in the plate 209 and connected to such plate by a pair of ball washers 217 which engage with circularly shaped recesses on opposite sides of the plate 209 to form a ball and socket connection between the arms 215 and the plate 209. The eccentric cams 218, 218 are provided with offset arms to which are pivotally connected the upper ends of a pair of links 219, 219, the latter of which are arranged in V-shaped fashion and are connected at their lower ends in superimposed relation by a pin block 220. The inner end of the pin block 220 is slidably engaged in a slot provided in a slide plate 221 which is attached to the longitudinally disposed plate 98, while the outer end of the pin block 220 is pivotally connected to the upper forked end of a link 222 which is connected at its lower end to the cam lever 200 intermediate the cam roller 202 and the forward end of such lever. It will be seen, therefore, that the initial idle upward movement of the cam lever 200 with respect to the link 198 functions to raise the link 222 to cause the pin block 220 to move upwardly in the slide 221, thereby raising and spreading the links 219, 219 and causing the eccentric cams 218, 218 through their connection with such links, to be rotated about their pivots 193, 193 in a clockwise manner, as viewed in Fig. 21, to the positions indicated in dotted lines in such figure. The clockwise movement of the eccentric cams 218, 218 draws downwardly the cam straps 216 which through their ball and socket connections 217, 217 with the plate 209, will thereupon force the latter down against the tension of springs 211 to secure the top end of the book between the bushings 205 and 208, as has been previously mentioned.

In order to prevent any upward movement of the plate 192 during this initial upward movement of the cam lever 200, means are provided to lock the plate 192 until the cam roller 202 rides on that portion of the cam 203 which is designed to lift the plate 192. The means for accomplishing this purpose comprises a sliding plate 223 which is disposed intermediate the longitudinally extending plates 97 and 98 and is slidably retained in position therebetween by means of the guide plates 224, 224 attached to opposed edge portions of the spaced plates 97 and 98, as is shown more clearly in Fig. 21 of the drawings. One end of the plate 223 is provided with a locking tongue 223a arranged to be inserted in the space between the upper longitudinally disposed plate 98 and the bracket 199 when the latter is in its lowermost position thereby effectively locking the bracket 199 against any upward movement which may be given it. The plate 223 is actuated into and out of locking position with the bracket 199 by a transversely disposed cam lever 225 whose forward end is engaged between a pair of spaced rearwardly extending lugs 223b, 223b, provided on the plate 223, as is shown in Fig. 21, and whose rear end is supported for pivotal movement in a horizontal plane by a bracket 226 attached to the rear of the body of the machine as is shown in Figs. 5 and 6 of the drawings. The lever 225 is provided intermediate its ends with a cam roller 227 which is maintained in engagement with the cam surface of a vertically disposed cam 228 by means of a spring 229 attached at one end to the cam lever 225 intermediate the roller 227 and the bracket 226 and at its other end to the cross frame 45 of the machine. The cam 228 which is mounted on the continuously rotating shaft 43, is formed so that the cam lever 225 is initially moved to the left, as viewed in Fig. 21 of the drawings, to bring the locking tongue 223a of the plate 223 into locking position with respect to the bracket 199, to lock the back plate 192 of the movable carriage in its lowermost position, thereby preventing any upward movement of the movable carriage I during the initial upward movement of the cam 200, whereby the book is clamped in position on the work table of such carriage. At the completion of this initial movement of the cam 200, the plate 223 is moved back to the position shown in Fig. 21 of the drawings by the cam 228 and the cam lever 225 so that the bracket 199 is released, thereby enabling the cam lever 200 as it is caused by the cam 202 to move upwardly on the next phase of its upward movement, to move the plate 192 upwardly thereby lifting the movable carriage I together with the associated clamping means hereinabove described, to feed the book to the drills 207.

The cam 203 of the machine disclosed is designed so that the movable carriage is slidably lifted through a distance of approximately one and three-eighths inches during the feeding movement bringing the table of the carriage, the plate 209 and its associated parts from the positions shown in Figs. 2, 3 and 22 with relation to the head to which the upper ends of the drills are attached, to the positions shown in Figs. 4, 5 and 25 with relation to such head, the lower ends of the drills in this latter position of the parts extending through the upper end of the book and into the lower guide bushings 206. At the end of the feeding operation the cam 203 as it continues to rotate, causes the cam lever 200 to move downwardly to return the table plate sections of the movable carriage I back to the level of the stationary table plate sections of the machine. Just before the completion of the downward movement of the cam lever 200, the cam lever 225 is actuated by its cam 228 to shift the sliding plate 223 outwardly or to the right, as viewed in Fig. 21, thereby causing a projecting arm portion 230 thereof to engage the lower offset end of an inclined lever 231 and to rotate such lever about its pivotal point 232 in a counter-clockwise direction, as viewed in Fig. 21. The upper end of the inclined lever 231 is operatively associated with the upper end of the right-hand link 219 (see Fig. 21) and when thus actuated operates to assist in forcing such link downwardly to cause the eccentric cams 218, 218 to raise the straps 216 mounted thereon and thereby lift the plate 209 and its associated parts out of clamping engagement with the book. The clamping plate 209 is also brought to unclamped position by means of a pair of upwardly projecting members 233 and 234 which are secured to the rear of the plate 98 of the machine and which serve as stops to prevent downward movement of the plate 209 with the movable carriage I as the latter is being retracted by the cam lever 200.

During the upward feeding movement of the movable carriage I, the pusher plate 148 engaging with the right-hand side of the book to be drilled, as viewed in Fig. 1, is through its engagement with the upper surfaces of the plate sections 90a and 91a of the movable carriage, lifted therewith, such upward movement of the plate 148 lifting the bolts 138 against the tension of the springs 141 which through the associated parts of the pusher mechanism hold the plate 148 firmly against the table of the movable carriage throughout its range of movement. The upward movement of the carriage I also lifts the stop plate 168 which, during such movement, maintains its contact with the plate sections 90a and 91a due to the sliding connection of the forked shaped portion 177 of the link 174 with the actuating bar 178, as has been previously described. As the carriage I is moved upwardly, the drills 207 whose lower drilling ends are normally positioned within the guide bushings 208, are brought into engagement with the top surfaces of the book. The drills 207, as can be more clearly seen in Figs. 27 and 28 of the drawings, are of the twist type and are each provided at their lower ends with a center point 236 which is relatively small in diameter and tapers to a fine point. The center point 236, as the book is advanced toward the drill pierces the paper well in advance of the periphery of the drill cutting the hole thereby controlling the passage of the drill through the book, the paper sheets thereof offering very little resistance to the point. The cutting of the hole is accomplished by two diametrically opposed cutting points 237, 237 provided on the periphery of the drill. As is shown more clearly in Fig. 27 of the drawings, the cutting points 237 are positioned at the outer leading edges 238a of the two twisted ribs 238, 238, such points having been formed by grinding away the ribs to provide concavely shaped bevels 238b, the lower edges of the latter of which join the cutting points 237, 237 with the center point 236 and are arcuately shaped. While it is preferred to construct the drills in this manner it will be understood that the drills may be ground so that the cutting portions 237, 237 are formed as arcuately shaped cutting edges rather than points.

The drills 207 are secured at their upper ends to a drill head compressing the chuck or drill holder members 240 which are arranged in a row along the center of a longitudinally extending plate 241 (see Figs. 25 and 26) and are rotatably supported at their bottom ends by such plate through bushings 242. The plate 241 underlies an intermediate plate 243 and an upper plate 244, all three of which are secured together in any suitable fashion and are supported at their outer ends by means of the longitudinally extending bracket plates 245, 245 which are secured to the transverse frame members 101 and 102 (see Figs. 1 and 21). The plates 241, 243 and 244 are also supported intermediate their ends by straps 246, 246 which are secured to the upper plate 244 and to the top cross plate 251 which is mounted on the upper cross frame members of the transverse frames 101 and 102. The upper ends of the socket members 240 are rotatably supported by bushings provided at the upper ends of the row of openings extending through the plate 243 in alignment with the row of openings in the plate 241. Intermediate the plates 243 and 244 is disposed a longitudinally extending bearing plate 248 against which bear the upper ends of the sockets 240 and through which extend the flexible driving shafts 249 which are secured to the upper ends of the sockets 240. The flexible shafts 249 are each enclosed in a metallic tube 249a which together with the flexible shafts 249 extend through openings provided in the plate 244 and which terminate at their lower ends in abutment against the upper surfaces of the plate 248. With this arrangement of the drill sockets 240, bearing plate 248, shafts 249 and tubes 249a, the sockets are maintained in position when upward pressure is exerted on the drills during the drilling operation and are prevented from coming into rubbing engagement with the ends of the tubes 249a thereby preventing any possible fracture of the drill tubes 249a in such manner.

The drive shafts 249 which are arranged in a longitudinal row at their lower ends, extend upwardly from the plate 244 in a basket formation and at their ends which are arranged in a circular fashion extend upwardly through a plurality of tubular shafts 250. The shafts 250 are arranged vertically in a circular fashion and extend through a pair of spaced plates 251 and 252 (see Figs. 23 and 24) mounted on top of the cross frames 101 and 102, as is shown more clearly in Figs. 4 and 5 of the drawings, the upper ends of such shafts being provided with integrally formed clamping heads 253 which rest on the upper surface of the plate 252 and which are securely connected to the upper ends of the drive shafts 249 by means of set screws. The upper ends of the shaft tubes 249a do not extend through the shafts 250 but terminate just short of the lower plate 251 and are secured intermediate a packing ring 254a and an annular plate 254 which are attached to the underside of the plate 251 in any suitable manner. Each of the shafts 250 has secured thereto intermediate the plates 251 and 252, a gear which engages with a horizontally disposed spur gear 256 whose hub rests on a thrust bearing 257 and is keyed to a vertically disposed shaft 258. The shaft 258 extends upwardly into a housing 259 and has keyed to its upper end a worm wheel 260 which rests on a thrust bearing 261 and engages with a worm 262 secured to the longitudinally extending shaft 29. By means of this arrangement the rotational movement that is imparted to the shaft 29 by the motor 27, is transmitted through the worm 262, worm wheel 260, shaft 258, spur gear 256 and gears 255 to each of the flexible shafts 249 and consequently through the drill sockets 240 to the drills 207, such movement being continuous and uninterrupted while the machine is in operation.

After a line or row of holes has been drilled in the top edge of a book, the movable carriage is brought back to the level of the stationary plate sections 90, 91, 90b and 91b in the manner previously described, the stop plate 168 and the pusher plate 148 returning therewith. The return of the pusher plate 148 is effected by means of the springs 141 associated therewith, the engagement of the plate 209 with the rearwardly extending reduced portion 165 of the plate and the engagement with the forward offset portion 164 with the latching member 187 on the plate section 91a of the movable carriage. On the next step-by-step movement of the chain conveyer G, the book is moved from the table plate sections 90a and 91a of the movable carriage onto the stationary plate sections 90b and 91b of the work table. Just prior to this operation, the cam 184 controlling the stop J operates the lever arm 182 through the tension of spring 186 to pivot the arms 179 inwardly, thereby moving the forked portion 177 of the link 174 inwardly to the dotted line position shown in Fig. 8 of the drawings, to cause the stop plate 168 to be lifted out of the path of movement of the book and the pusher plate 148 engaging it. When the pusher plate 148 moves onto the plate sections 90b and 91b of the work table, the spaced rollers 161 associated therewith ride up onto a pair of spaced tracks 263 and 264 (see Fig. 7) which pivot the pusher plate 148 about the shaft 140 to bring it to a position substantially at right angles to the surfaces of the plates 90b and 91b thereby straightening the sheets in the book so that the side edges thereof are vertically disposed. The rear guide member 167b on the plate section 90b is straight edged on the side engaged by the book so that the sheets which have been arcuately arranged lengthwise in their travels over the plates 90, 91, 90a and 91a, are straightened into proper book form as shown in Fig. 12 of the drawings. The books may then be removed by the operator or conveyed directly to a machine for inserting the spiral binding wire illustrated in Figs. 11, 31 and 32 of the drawings, the holes in the book as rearranged conforming to the curvature of the portions of the convolutions of the wire to be inserted therethrough so that this operation is greatly facilitated.

From the above detailed description, it is believed that the construction and operation of the disclosed embodiment of the invention will be clearly understood and it will be seen that there has been provided a machine which will simultaneously in one operation drill closely related and relatively small holes entirely through a book, the pages of which are automatically arranged so that a spiral binding can be applied readily thereto and when so applied the pages of the book will all be superimposed one upon the other with their edges in proper alignment and contained in vertical planes. To accomplish this result the books, as has been described, are brought into drilling position upon the movable carriage I during the step-by-step movement of the chain conveyer G with the side edges arranged in inclined fashion and the top and bottom edges arcuately shaped so that in the final book form with the sheets straightened, the holes drilled therein will assume the configuration of those portions of the spiral spring bindings which are to be inserted through the holes. During the drilling operation, the binding edge of the book is clamped between the upper and lower sets of guide bushings to produce an annular pressure around each of the areas to be entered by the drills sufficient to consolidate all the sheets of the book in such regions into an almost solid form. It has been found that the nearer a solid the paper is in the areas drilled the more satisfactory are the results obtained. For example, it has been found that if only enough pressure is applied to hold the sheets together, the edges of the drilled holes will be ragged. It is preferred, therefore, to consolidate the sheets of the book together to such an extent that there is a tendency of the sheets to stick together due to the welding of the fibers of the sheets together, so that there is provided a cylindrically shaped substantially solid body through which the point of the drill will perforate exactly aligned with the axis of the associated top and bottom bushings and extending from the top to the bottom sheets inclusive. It has been found necessary for a satisfactory carrying out of the invention that the pressure areas be of annular form around the areas to be removed by the drills. Unsatisfactory results were attained when a single pressure bar was used to provide a single strip of pressure across the top of the book. The pressure required to produce satisfactory results depends somewhat on the type of paper used and the condition of the drills but should preferably be as much as the paper will stand without breaking down. In actual operation best results were obtained by bringing the bushings against the sheets with such pressure as to substantially indent the outer sheets below the outer surfaces of the book, the inner circumference of such annular indentations defining the areas to be removed by the drills. Within the confines of such annular rings of pressure the sheets are puckered or slightly convex, which condition is advantageous in the drilling operation.

The drills are guided in their drilling movement by the upper set of guide bushings 208 which have a relatively long shank, the annular consolidated portions of the book intermediate such bushings, and the center points of the drills which are small in diameter tapering to a fine point and which pierce the paper well in advance of the peripheries of the drills which cut the holes. Due to the form of the center point of the drill and the fact that the paper within the annular ring of pressure is puckered, the paper offers very little resistance to the advancement of the center point of the drill which controls the passage of the drill through the paper so that it follows a straight course directly into the lower bushings.

During the drilling operation the drills are preferably rotated at a speed of from three to ten thousand revolutions per minute, the cutting points on the peripheries of the drills first cutting out discs of paper from the book which as the drills are advanced are forced up the drills and then broken in two by the lips of the drills. As the paper discs travel up the spiral of the drill they are formed into coarse granules by their contact with the wall of the hole which exerts a grinding action on such upwardly moving pieces of paper and rolls them up into small particles or lumps, the lumps being made up of paper from more than one sheet in frictional or adhesive contact and appearing as coarse granules. Practically all of the material cut from the book is delivered by the drill up through the upper guide bushing where it is discharged, the waste material due to the angular disposition of the plate 209 passing over the latter and being discharged at the back of the machine where some suitable means may be provided for gathering such waste. The half bushings or guide grooves 214a above the upper bushings assist in this discharge of the waste. Any paper waste clinging to the drills is wiped off by the upper guide bushings as the drills are retracted therein at the end of the drilling operation and fall to the rear of the machine clear of the operating mechanism.

The holes drilled by the machine above described are clean and symmetrical and uniformly spaced both with respect to each other and to the back edge of the book. The construction and arrangement of the parts of the machine are such that the drills can be brought so closely together as to drill a row of holes whose side edges will touch. Furthermore, the holes can be drilled quite closely to the binding edge of the book and may even be drilled as partial holes if required.

It is to be observed from the foregoing, that the outstanding or critical features of this invention involve the pressure-exerting members or bushings 206 and 208 which by reason of their pressure-exerting characteristics upon the book, compress the individual sheets, solidifying or compacting that portion of the book as a whole which is under the pressure influence of each individual pair of pressure-exerting members or bushings 206 and 208, even to such an extent as to indent sheets on each side of the book to a substantial extent extending inwardly of the book and while the sheets are thus retained under compression, each drill in cooperation with its associated pressure members or bushings functions individually to form a cylindrical channel through the book, the circumference of the channel being defined by the inner edge of that portion of the book directly between and aligned with the end surfaces of the pressure members or bushings. Consequently, each individual row of holes is formed separately by a pair of pressure members or bushings 206, 208 and the individual drill associated with each pair of such pressure members or bushings.

When the machine is assembled, each pair of cooperating pressure members or bushings is accurately spaced apart to accommodate the work or thickness of the book to be drilled, each pair of bushings being adjusted or set individually to accurately exert the required pressure. In the specific embodiment shown in the drawings, the bushings 206 and 208 are so adjusted in the clamping plate 209 and the table plate 90a, respectively, and held in the adjusted position by friction against the walls of their respective plates and by the shoulders of each bushing, as will be observed by reference to Fig. 25. The bushings may, if desired, be made adjustable and held in adjusted position by other means than friction or by the use of such shoulders, as, for instance, by a screw-threaded arrangement and suitable nut-locking means. For practical purposes, it has been found that inasmuch as the pressure exerted by the bushings 206 and 208 is in an inward direction, the frictional engagement of the bushings and the engagement of the shoulders on the heads of the bushings is sufficient to retain the bushings in their adjusted positions.

Having thus illustrated and described an embodiment of the invention which is best adapted for the construction of books provided with spiral binding wires, it will be obvious to those skilled in the art that changes in the form, construction and arrangement of the several parts may be resorted to without departing from the spirit and scope of the invention. For example, instead of using drills formed as shown in Figs. 27 and 28, the drills may be formed so that the cutting points 237 on the periphery of the drill are arcuately shaped, as is indicated by the numeral 237' in Fig. 33 of the drawings, such cutting edges 237' being formed by grinding smaller concavely shaped bevels than those indicated by the numeral 238b in Figs. 27 and 28 of the drawings so that more of the peripheries of the twisted ribs 238' are utilized as cutting edges and joining such cutting edges 237' with the center point 236' by triangularly and arcuately shaped ground surfaces instead of the arcuately shaped edges joining the cutting points 237 with the center point 236 in the embodiment shown in Figs. 27 and 28. Another form of drill which will satisfactorily accomplish the purposes of the invention is illustrated in Fig. 34 of the drawings. In this embodiment the center point and one of the cutting points are entirely omitted, the single cutting point 265 being formed at the outer leading edge 266 of the twisted rib 267 and the drill being ground away to provide a twisted drill point.

I claim:

1. In a paper cutting machine, a movable support having a plurality of holders adapted to retain books of sheets, said holders including means to arrange the sheets in each book so that the top and bottom ends of the sheets are arcuately arranged to a predetermined curvature, a work table associated with said movable support and means for transferring the books of sheets from said holders to said work table without disturbing the arrangement of the sheets.

2. In a paper cutting machine, a movable support having a plurality of holders adapted to retain books of sheets, each of said holders including a seating plate on which the book is supported and which is concavely shaped so as to arrange the ends of the sheets resting thereon in a convex fashion and a pair of spaced plates adapted to maintain the sheets of the book in proper arrangement, a work table associated with said movable support and means for transferring the books in succession from said holders to said work table without disturbing the arrangement of the sheets constituting such books.

3. In a paper cutting machine, a movable support having a plurality of holders adapted to retain books of sheets, each of said holders including a seating plate on which the book rests and which is provided with a concavely shaped seat so that the ends of the sheets of a book positioned thereon are arranged in a convex manner, means for holding the sheets of the book in book form, means hingedly connecting said holders to said movable support, a work table, means for pivoting said holders towards said work table and means for transferring the books from the pivoted holders onto said work table.

4. In a paper cutting machine, a movable support, a plurality of holders hingedly mounted on said support and adapted to retain books of sheets, a guide rail, a roller carried by each of said holders, spring means for maintaining said roller in engagement with said guide rail and said holder in a predetermined position, means for tilting said holder from said position, a work table, and means for successively transferring the books from said holders to said work table as they are tilted from said predetermined position.

5. In a paper cutting machine, a support arranged to move in a step-by-step fashion, a plurality of holders hingedly mounted on said support and adapted to retain books of sheets, means for maintaining said holders in upright position, means for tilting said holders during a predetermined portion of the travel of said support, a work table, and means for successively transferring the books from said holders to said table after they arrive at said predetermined portion of the travel of said support and during the periods of rest of said support.

6. In a paper cutting machine, a movable support having a plurality of holders adapted to retain books, a work table and means for transferring the books from said holders to said table, said means including transfer members disposed below the path of travel of said holders, means for moving said transfer members up into engagement with a book in a holder and for causing said transfer members to move towards said work table to strip the book from said holder and place it on said work table.

7. In a paper cutting machine, a movable support having a plurality of spaced holders, each of which is adapted to receive a book of sheets, said holders including means to arrange the sheets of each book in a predetermined fashion, a work table and means intermediate said movable support and said work table for successively transferring the books from said holders to said table without disturbing the arrangement of the sheets, said means including a slide mounted for movement towards and away from said work table and provided with a transfer member, and actuating means arranged initially to cause said transfer member to engage a book in a holder and then to move said slide and transfer member as a unit to transfer the book from the holder to said work table.

8. In a paper cutting machine, a support movable in a step-by-step fashion and having a plurality of holders hingedly mounted thereon and adapted to retain books of sheets, said holders including means to arrange the sheets of a book in a predetermined fashion, means for tilting said holders at a predetermined portion of the travel of said movable support, a work table and means for transferring the books from said holders to said work table during the periods of rest of said support, said last mentioned means including a slide arranged for movement between the predetermined portion of the travel of said movable support and said work table, a transfer member mounted on said slide and having the book engaging surface thereof formed in a similar manner to the sheet arranging means of said holders, a cam lever, a cam to actuate said cam lever during the periods of rest of said movable support, and means connecting said cam lever to said slide and adapted upon movement of said cam lever to cause said transfer member initially to engage the book in a tilted holder and then to cause movement of said slide to transfer the book without disturbing the arrangement of the sheets thereof to said work table.

9. In a paper cutting machine, a work table having a stationary section and a movable section, a plurality of pusher members, movable means adapted in the course of its movement to transmit its motion to said pusher members and thereby to advance said pusher members over said table sections in a step-by-step fashion, a plurality of drills associated with said movable section of the table, and means for moving said movable section of the table relative to said drills during the periods of rest of said pusher members.

10. In a paper cutting machine, a work table having a stationary section and a movable section, a movable support, a plurality of pusher members provided in said support and resting on said table sections, means for moving said support so that said pusher members are advanced over said table sections in a step-by-step fashion, a plurality of drills associated with said movable section, a stop member on said movable section adapted to engage an edge of a book deposited on such section in position to be drilled, means for moving said movable section of the table relative to said drills during the periods of rest of said pusher members, said pusher members being connected to said movable support to enable them to move relative thereto and with said movable section of the table.

11. A paper cutting machine such as is defined in claim 10, including actuating means for intermittently operating said stop member and means connecting said member to said actuating means, said last mentioned means being adapted to enable said stop member to move relative to said actuating means on movement of the movable section of said table and to lift said stop member above such section when actuated by said actuating means.

12. In a paper cutting machine, a work table having an inclined stationary section and an inclined movable section, a plurality of drills associated with said inclined movable section, guide means at the lower ends of said sections to arrange the binding end of the sheets of a book in an arcuate fashion, means for feeding said books from said stationary section to said movable section and adapted to arrange the side edges of the sheets in an inclined manner, and means for moving said movable section relative to said drills to feed the sheets of a book as thus arranged to the drills.

13. In a paper cutting machine, a work table, a plurality of drills associated with said table, means on said table to arrange the sheets of a book in a predetermined fashion with the edges thereof on at least two opposite sides of the book contained in planes other than those perpendicular to the top face of the book as the book is moved into drilling position and means to cause relative movement between said drills and table to drill a row of holes in said predetermined arrangement of sheets.

14. In a paper cutting machine a work table having a movable section intermediate two stationary sections, a plurality of drills associated with said movable section, means for feeding books of sheets across said sections with a step-by-step movement, means including said feeding means for arranging the sheets of the books in a predetermined fashion during the feeding movement to said movable section, means for moving said movable section relative to said drills during the periods of rest of said feeding means to drill the books deposited on such section, and means for rearranging the sheets into proper book form as they are fed away from said movable section.

15. In a paper cutting machine, the combination with a work table, of a row of twist drills associated therewith for drilling a row of holes in a book of sheets deposited on said table and clamping means adapted to produce on the sheets a row of restricted pressure areas so applied that such pressure areas circumscribe the portions of the book to be penetrated by the drills.

16. In a paper cutting machine, the combination with a work table, of a row of twist drills associated therewith for drilling a row of holes in a book of sheets deposited on said table, each of said drills having two peripherally disposed cutting points and a center point projecting in advance of said cutting points and clamping means adapted to produce on the sheets a row of pressure areas so applied that such pressure areas circumscribe the portions of the book to be penetrated by the drills.

17. In a paper cutting machine, the combination with a work table, of a row of twist drills associated therewith for drilling a row of holes in a book of sheets deposited on said table, each of said drills having a cutting point provided on the leading edge of each twisted rib and a center point projecting in advance of said cutting points and clamping means adapted to produce on the sheets a row of pressure areas so applied that such pressure areas circumscribe the portions of the book to be penetrated by the drills.

18. In a paper cutting machine, the combination with a work table, of a row of twist drills associated therewith for drilling a row of holes in a book of sheets deposited on said table, the ribs of said twist drills being bevelled to provide two cutting points and a lead point, means for continuously rotating said drills at a speed of from 3,000 to 10,000 revolutions per minute and clamping means adapted to produce on the sheets a row of pressure areas so applied that such pressure areas circumscribe the portions of the book to be penetrated by the drills.

19. In a paper cutting machine, a work table, a row of twist drills associated with said table, an upper and a lower row of guide bushings for said drills, the bushings of the upper row being aligned with the bushings of the lower row and each of said bushings having a surface portion formed to engage with a surface of the book and in such condition to encompass the portion of the book to be cut out by its associated drill means for causing a relative movement of said bushings towards one another to clamp a book therebetween so as to produce a row of pressure areas encompassing the portions of the book to be drilled and means for causing a relative movement between said twist drills and work table.

20. In a paper cutting machine, a work table, a row of twist drills associated with said table, an upper and a lower row of guide bushings for said drills, said upper and lower bushings having annular portions at their lower and upper ends, respectively, for engagement with the upper and under surfaces of a book, means for causing a relative movement between said rows of bushings to clamp a book therebetween so as to produce a row of annular pressure areas around the portions of the book to be drilled and means for causing a relative movement between said twist drills and work table.

21. In a paper cutting machine, a movable work table, a row of twist drills associated with said table, clamping means for producing a row of restricted pressure areas encompassing the portions of the book to be drilled and for guiding said drills, means for actuating said clamping means when a book of sheets is fed to said table and for causing said clamping means to engage the book with a positive constant pressure sufficient to consolidate the paper in the restricted areas to less than normal thickness and means for moving said table towards said row of drills after said clamping means have been actuated.

22. In a paper cutting machine, a work table, a plurality of twist drills associated with said table and arranged in a row above said work table, an upper and a lower row of aligned guide members for said drills, means on said table to arrange a book of sheets in a predetermined fashion different from proper book form, and means for causing initially a relative movement of said rows of guide members toward one another to clamp the predeterminedly arranged book of sheets therebetween and to produce throughout the thickness of said book a row of annular pressure areas encompassing the portions of the book to be drilled, said last mentioned means thereupon being operable to cause a relative movement between said twist drills and work table whereby the drills engage with the book within the areas of annular pressure.

23. The method of cutting a plurality of holes in a book of paper sheets which comprises subjecting the sheets of the book to transverse pressure applied in such manner as to produce a localized pressure area encompassing each of the portions of the book to be removed and extending throughout the thickness of the book, cutting out the portions of the book encompassed by such transverse pressure areas by a masticating operation, and during the drilling out of such portions exerting a constant pressure sufficient to consolidate all of the sheets of the book within the confines of such pressure areas into an almost solid form.

24. The method of cutting a plurality of holes in a book of paper sheets which comprises subjecting the sheets of the book to transverse pressure applied in such manner as to produce localized transverse annular pressure areas encompassing each of the portions of the book to be removed, the inside diameter of each of said annular pressure areas defining the areas of the portions of the book to be removed, cutting out the portions of the book encompassed by such transverse pressure areas by a masticating operation, and during the removal of such portions exerting a constant pressure at such pressure areas such as to indent the sheets on each side of the book to a substantial extent extending inwardly of the book.

25. The method of cutting a plurality of holes in a book of paper sheets which comprises arranging the sheets of the book so that the top and bottom edges thereof are arcuately arranged while the side edges thereof are arranged in an inclined manner subjecting the sheets of the book as thus arranged to transverse pressure applied in such manner as to produce a localized pressure area around each of the portions of the book to be removed and extending throughout the thickness of the book, cutting out the portions of the book encompassed by such transverse pressure areas by a masticating operation, and during the drilling out of such portions exerting a constant pressure sufficient to consolidate all the sheets of the book within the confines of such pressure areas into a substantially solid form.

26. In a paper cutting machine, a movable work table, a row of twist drills associated with said table, means for clamping a book deposited on said table, means for moving said work table relative to said drills and for actuating said clamping means, including an operating member and connecting members adapted to enable said operating member initially to actuate said clamping means and then, on continuation of its operating stroke, to move said work table, and means for preventing movement of said work table while said operating member is actuating said clamping means.

27. The method of manufacturing a loose-leaf book which comprises arranging a book of sheets so that the top and bottom edges thereof are arcuately arranged, while the side edges thereof are arranged in an inclined manner, drilling a row of straight holes along one edge of the book of sheets as thus arranged, rearranging the drilled sheets into proper book form so that the drilled holes are arcuately shaped when viewed in one direction and obliquely disposed when viewed in another direction, and then threading a spirally shaped wire through the thus arranged sheets.

28. The method of perforating a multiplicity of holes along the binding edge of a book of paper sheets, which comprises arranging the sheets of the book along the binding edge with sheets between the top and bottom sheets extending outwardly between the vertical planes of the top and bottom sheets, the free edges of the book opposite the binding edge extending inwardly of the vertical plane of the top and bottom sheets, holding said sheets in such arrangement, perforating the sheets along the binding edge with a multiplicity of holes, rearranging the sheets so that the edges of the sheets along the binding edge are in substantially the same vertical plane, associating said sheets with a binder having curved portions passing through said perforations.

29. In a paper cutting machine, a work table, a multiplicity of drills disposed with respect to said work table, means for producing a series of spaced, restricted pressure areas encompassing the portions of the book to be drilled, means for actuating said first-mentioned means to cause the latter to engage with a book positioned on said table with positive pressure sufficient to consolidate the thickness of the book in the spaced, restricted areas to less than its normal thickness and means for causing a relative movement between said drills and work table after said first-mentioned means has been actuated and of an extent greater than the thickness of the book to enable the drills in their drilling action to pass entirely through the book.

WILLIAM A. DE HART.